(12) United States Patent
Ihara et al.

(10) Patent No.: US 7,139,090 B2
(45) Date of Patent: Nov. 21, 2006

(54) METHOD AND DEVICE FOR CONTROLLING THE PRINTING, PRINTER DEVICE, PRINTING METHOD, PRINTING SYSTEM AND PRINTING METHOD

(75) Inventors: Yushi Ihara, Kanagawa (JP); Koichiro Ishigami, Tokyo (JP)

(73) Assignee: Sony Corporation, Tokyo (JP)

( * ) Notice: Subject to any disclaimer, the term of this patent is extended or adjusted under 35 U.S.C. 154(b) by 79 days.

(21) Appl. No.: 10/385,182

(22) Filed: Mar. 10, 2003

(65) Prior Publication Data

US 2003/0164976 A1 Sep. 4, 2003

Related U.S. Application Data

(62) Division of application No. 09/660,652, filed on Sep. 13, 2000, now Pat. No. 6,695,494.

(30) Foreign Application Priority Data

Sep. 14, 1999 (JP) .................................. 11-261278

(51) Int. Cl.
- *G06F 15/00* (2006.01)
- *B41J 1/00* (2006.01)
- *H04N 7/00* (2006.01)
- *H04N 7/16* (2006.01)

(52) U.S. Cl. ..................... 358/1.15; 348/552; 725/153
(58) Field of Classification Search ............... 358/1.15, 358/1.16, 1.9, 1.12, 1.14, 1.13; 709/224, 709/223, 227; 710/107; 345/736, 339, 356; 348/552; 725/153

See application file for complete search history.

(56) References Cited

U.S. PATENT DOCUMENTS

| | | | |
|---|---|---|---|
| 3,771,124 A | 11/1973 | McMahon | |
| 3,796,497 A | 3/1974 | Mathisen et al. | |
| 3,891,968 A | 6/1975 | McMahon | |
| 4,218,623 A | 8/1980 | Utagawa | |
| 4,513,441 A | 4/1985 | Henshaw | |
| 5,119,443 A | 6/1992 | Javidi et al. | |

(Continued)

OTHER PUBLICATIONS

Donald H. McMahon, Gilbert L. Johnson, Stanley L. Teeter, Colin G. Whitney; A Hybrid Optical Computer Processing Technique for Fingerprint Identification; Apr. 1975; 358-369; vol. C-24, No. 4.

*Primary Examiner*—Kimberly Williams
*Assistant Examiner*—Charlotte M. Baker
(74) *Attorney, Agent, or Firm*—Frommer Lawrence & Haug LLP; William S. Frommer; Thomas F. Presson

(57) ABSTRACT

A printing system including printing equipment in which, even if the equipment are interconnected through an interface pursuant to the IEEE 1394 standard, the printing image may be set to effect printing. There is provided a CPU 23 for generating the printing control information containing the text printing image information indicating the picture processing contents for the text at the time of printing and the picture printing image information indicating the processing contents for a picture at the time of printing. There is also provided a data conversion unit 13 which manages control so that picture data and the printing control information will be contained in a packet consistent with the IEEE 1394 standard and sent as output to a printer device 5, and so that the picture data contained in the packet sent as output to the printer device 5 will be printed in accordance with the printing control information. When packets are transmitted/received between the equipment interconnected through the IEEE 1394 interface to print the picture data, the picture processing consistent with the text printing image information and the picture printing image information is performed on the picture data on the side printer device 5 to print the text or the picture.

2 Claims, 42 Drawing Sheets

U.S. PATENT DOCUMENTS

| | | |
|---|---|---|
| 5,172,000 A | 12/1992 | Scheff et al. |
| 5,216,541 A | 6/1993 | Takesue et al. |
| 5,309,523 A | 5/1994 | Iwaki et al. |
| 5,327,286 A | 7/1994 | Sampsell et al. |
| 5,363,455 A | 11/1994 | Nishii et al. |
| 5,471,066 A | 11/1995 | Hagiwara |
| 5,761,330 A | 6/1998 | Stoianov et al. |
| 5,883,621 A * | 3/1999 | Iwamura ................ 725/37 |
| 6,038,625 A * | 3/2000 | Ogino et al. ............. 710/104 |
| 6,298,194 B1 * | 10/2001 | Takahashi ............... 386/46 |
| 6,298,405 B1 * | 10/2001 | Ito et al. ................. 710/107 |
| 6,473,797 B1 * | 10/2002 | Hirasawa ................ 709/224 |
| 6,603,737 B1 * | 8/2003 | Fukunaga et al. ......... 370/229 |

* cited by examiner

| NAME | pixel_x | pixel_y | interlaced/ progressive | pixel format | screen aspect ratio | pixel aspect ratio | image size |
|---|---|---|---|---|---|---|---|
| 1080_422_16×9 | 1920 | 1080 | interlaced/ progressive | YCbCr 4:2:2 | 16:9 | 1:1 | 3.96MB |
| 1080_420_16×9 | 1920 | 1080 | interlaced/ progressive | YCbCr 4:2:0 | 16:9 | 1:1 | 2.97MB |
| 720_422_16×9 | 1280 | 720 | progressive | YCbCr 4:2:2 | 16:9 | 1:1 | 1.76MB |
| 720_420_16×9 | 1280 | 720 | progressive | YCbCr 4:2:0 | 16:9 | 1:1 | 1.32MB |
| 480_422_16×9 | 720 | 480 | interlaced/ progressive | YCbCr 4:2:2 | 16:9 | 1.91:1 | 675KB |
| 480_420_16×9 | 720 | 480 | interlaced/ progressive | YCbCr 4:2:0 | 16:9 | 1.91:1 | 506KB |
| 480_422_4×3 | 720 | 480 | interlaced/ progressive | YCbCr 4:2:2 | 4:3 | 0.89:1 | 675KB |
| 480_420_4×3 | 720 | 480 | interlaced/ progressive | YCbCr 4:2:0 | 4:3 | 0.89:1 | 506KB |

FIG.6

| | msb | | | | | | lsb |
|---|---|---|---|---|---|---|---|
| opcode | colspan="7" | CAPTURE(XX$_{16}$) |
| operand [0] | colspan="7" | subfunction |
| operand [1] | colspan="5" | source_subunit_type | colspan="2" | source_subunit_ID |
| operand [2] | colspan="7" | source_plug |
| operand [3] | colspan="7" | status |
| operand [4] | colspan="7" | dest_plug |
| operand [5] | colspan="7" rowspan="3" | print_job_ID |
| ⋮ | |
| operand [16] | |
| operand [17] | colspan="7" rowspan="4" | data_size |
| operand [18] | |
| operand [19] | |
| operand [20] | |
| operand [21] | colspan="7" rowspan="2" | image_size_x |
| operand [22] | |
| operand [23] | colspan="7" rowspan="2" | image_size_y |
| operand [24] | |
| operand [25] | colspan="7" | image_format_specifier |
| operand [26] | colspan="7" | Next_pic |
| operand [27] | colspan="7" rowspan="2" | Next_page |
| operand [28] | |

FIG.7

| value | Type | Meaning |
|---|---|---|
| $20_{16}$ | 1080i _ 422plane _ 16×9 | |
| $21_{16}$ | 1080p _ 422plane _ 16×9 | |
| $22_{16}$ | 720p _ 422plane _ 16×9 | |
| $23_{16}$ | 480i _ 422plane _ 16×9 | |
| $24_{16}$ | 480p _ 422plane _ 16×9 | |
| $25_{16}$ | 480i _ 422plane _ 4×3 | |
| $26_{16}$ | 480p _ 422plane _ 4×3 | |
| $28_{16}$ | 1080i _ 422line _ 16×9 | |
| $29_{16}$ | 1080p _ 422line _ 16×9 | |
| $2A_{16}$ | 720p _ 422line _ 16×9 | |
| $2B_{16}$ | 480i _ 422line _ 16×9 | |
| $2C_{16}$ | 480p _ 422line _ 16×9 | |
| $2D_{16}$ | 480i _ 422line _ 4×3 | |
| $2E_{16}$ | 480p _ 422line _ 4×3 | |
| $30_{16}$ | 1080i _ 420plane _ 16×9 | |
| $31_{16}$ | 1080p _ 420plane _ 16×9 | |
| $32_{16}$ | 720p _ 420plane _ 16×9 | |
| $33_{16}$ | 480i _ 420plane _ 16×9 | |
| $34_{16}$ | 480p _ 420plane _ 16×9 | |
| $35_{16}$ | 480i _ 420plane _ 4×3 | |
| $36_{16}$ | 480p _ 420plane _ 4×3 | |
| $38_{16}$ | 1080i _ 420line _ 16×9 | |
| $39_{16}$ | 1080p _ 420line _ 16×9 | |
| $3A_{16}$ | 720p _ 420line _ 16×9 | |
| $3B_{16}$ | 480i _ 420line _ 16×9 | |
| $3C_{16}$ | 480p _ 420line _ 16×9 | |
| $3D_{16}$ | 480i _ 420line _ 4×3 | |
| $3E_{16}$ | 480p _ 420line _ 4×3 | |
| $60_{16}$ | Text(ASCII) | MD-clip ASCII |
| $61_{16}$ | Text(ISO8859-1) | MD-clip modified ISO8859-1 |
| $62_{16}$ | Text(Music Shifted JIS) | MD-clip Music Shifted JIS |

FIG.8

| Address Offset | 1st byte | 2nd byte | 3rd byte | 4th byte |
|---|---|---|---|---|
| 00 00 00 00$_{16}$ | Y0(L0) | Y1(L0) | Cb0(L0) | Cr0(L0) |
| 00 00 00 04$_{16}$ | Y2(L0) | Y3(L0) | Cb2(L0) | Cr2(L0) |
| ⋮ | | ⋮ | | |
| 00 00 05 9C$_{16}$ | Y718(L0) | Y719(L0) | Cb718(L0) | Cr718(L0) |
| 00 00 05 A0$_{16}$ | Y0(L1) | Y1(L1) | Cb0(L1) | Cr0(L1) |
| ⋮ | | ⋮ | | |
| 00 0A 8B FC$_{16}$ | Y718(L479) | Y719(L479) | Cb718(L479) | Cr718(L479) |

FIG.9

| Address Offset | 1st byte | 2nd byte | 3rd byte | 4th byte |
|---|---|---|---|---|
| 00 00 00 00$_{16}$ | Y0(L0) | Y1(L0) | Y0(L1) | Y1(L1) |
| 00 00 00 04$_{16}$ | Cr0(L0) | Cr0(L0) | Y2(L0) | Y3(L0) |
| 00 00 00 08$_{16}$ | Y2(L1) | Y3(L1) | Cb2(L0) | Cr2(L0) |
| ⋮ | | ⋮ | | |
| 00 07 E8 F8$_{16}$ | Cb716(L478) | Cr716(L478) | Y718(L478) | Y719(L478) |
| 00 07 E8 FC$_{16}$ | Y718(L479) | Y719(L479) | Cb718(L478) | Cr718(L478) |

FIG.10

| Address Offset | 1st byte | 2nd byte | 3rd byte | 4th byte |
|---|---|---|---|---|
| 00 00 00 00$_{16}$ | Y0(L0) | Y1(L0) | Y2(L0) | Y3(L0) |
| ⋮ | | ⋮ | | |
| 00 00 02 CF$_{16}$ | Y716(L0) | Y717(L0) | Y718(L0) | Y719(L0) |
| 00 00 02 D0$_{16}$ | Cb0(L0) | Cr0(L0) | Cb2(L0) | Cr2(L0) |
| ⋮ | | ⋮ | | |
| 00 00 05 9F$_{16}$ | Cb716(L0) | Cr716(L0) | Cb718(L0) | Cr718(L0) |
| 00 00 05 A0$_{16}$ | Y0(L1) | Y1(L1) | Y2(L1) | Y3(L1) |
| ⋮ | | ⋮ | | |
| 00 0A 8B FC$_{16}$ | Cb716(L479) | Cr716(L479) | Cb718(L479) | Cr718(L479) |

FIG.11

| Address Offset | 1st byte | 2nd byte | 3rd byte | 4th byte |
|---|---|---|---|---|
| 00 00 00 00$_{16}$ | Y0(L0) | Y1(L0) | Y2(L0) | Y3(L0) |
| ⋮ | | ⋮ | | |
| 00 00 02 CF$_{16}$ | Y716(L0) | Y717(L0) | Y718(L0) | Y719(L0) |
| 00 00 02 D0$_{16}$ | Y0(L1) | Y1(L1) | Y2(L1) | Y3(L1) |
| ⋮ | | ⋮ | | |
| 00 00 05 9F$_{16}$ | Y716(L1) | Y717(L1) | Y718(L1) | Y719(L1) |
| 00 00 05 A0$_{16}$ | Cb0(L0) | Cr0(L0) | Cb2(L0) | Cr2(L0) |
| ⋮ | | ⋮ | | |
| 00 00 08 6F$_{16}$ | Cb716(L0) | Cr716(L0) | Cb718(L0) | Cr718(L0) |
| 00 00 08 70$_{16}$ | Y0(L2) | Y1(L2) | Y2(L2) | Y3(L2) |
| ⋮ | | ⋮ | | |
| 00 07 E8 FC$_{16}$ | Cb716(L478) | Cr716(L478) | Cb718(L478) | Cr718(L478) |

FIG.12

|  | msb | | | | | | lsb |
|---|---|---|---|---|---|---|---|
| opcode | \multicolumn{7}{c}{OPERATION MODE2($51_{16}$)} |
| operand [0] | \multicolumn{7}{c}{subfunction} |
| operand [1] | \multicolumn{7}{c}{status} |
| operand [2] | \multicolumn{7}{c}{reserved} |
| operand [3] | | | | | | | |
| operand [4] | | | | | | | |
| operand [5] | \multicolumn{7}{c}{print_job_ID} |
| ⋮ | | | | | | | |
| operand [16] | | | | | | | |
| operand [17] | \multicolumn{7}{c}{Operation_mode2_parameters} |
| ⋮ | | | | | | | |
| operand [31] | | | | | | | |

FIG.13

| Value | Symbol | Meaning |
|---|---|---|
| $01_{16}$ | get | Get the current operation modes |
| $02_{16}$ | set | Set the specified operation modes |
| $03_{16}$ | query | Get the supported operation modes |
| Other values | – | Reserved |

FIG.14

| Address Offset | Contents |
|---|---|
| $00_{16}$ | media_type |
| $01_{16}$ | Media_size |
| $02_{16}$ | |
| $03_{16}$ | |
| $04_{16}$ | reserved |
| $05_{16}$ | Print_quality |
| $06_{16}$ | Mono_color |
| $07_{16}$ | offset |
| $08_{16}$ | |
| $09_{16}$ | |
| $0A_{16}$ | |
| $0B_{16}$ | Layout_type |
| $0C_{16}$ | |
| $0D_{16}$ | |
| $0E_{16}$ | |

FIG.15

| Symbol | Meaning |
|---|---|
| device_dependent | The image output will be sized as device dependent. (Mandatory) |
| Plain_paper | ORDINARY PAPER |
| Bond_paper | SEAL |
| Special_paper | DEDICATED PAPER |
| Photo_paper | PHOTO PAPER |
| Tranaparency_film | OHP FILM |

FIG.17

| address offset | msb | | | | | | | lsb |
|---|---|---|---|---|---|---|---|---|
| $00_{16}$ | device_dependent | A5 | A4 | B5 | Executive | Letter | Legal | Reserved |
| $01_{16}$ | Hagaki | Oufuku_hagaki | A6 | Index_4×6 | Index_5×8 | A3 | B4 | Legal_11X17 |
| $02_{16}$ | Commerci all0_portr alt | Commerci all0_lands cape | DL | C6 | A2 | Custom | reserved | |

FIG.18

| Symbol | Meaning |
|---|---|
| Device_dependent | The image output will be sized as device dependent. (Mandatory) |
| A5 | ISO and JIS A5 |
| A4 | ISO and JIS A4 |
| B5 | JIS B5 |
| Executive | US Executive |
| Letter | US Letter |
| Legal | US Legal |
| Hagaki | HAGAKI |
| Oufuku_hagaki | OUHUKU HAGAKI |
| A6 | ISO and JIS A6 Card |
| Index_4×6 | US Index Card4"×6" |
| Index_5×8 | US Index Card5"×3" |
| A3 | ISO A3 |
| B4 | B4 |
| Legal_11×17 | Legal 11×17 |
| Commercial10_portrait | US Comercial#10(portrait) |
| Commercial10_landscape | US Comercial#10(landscape) |
| DL | International DL |
| C6 | International C6 |
| A2 | US A2 |
| Custom | Custom paper |

FIG.19

| address offset | msb | | | | | | lsb |
|---|---|---|---|---|---|---|---|
| $00_{16}$ | device-dependent | other | letter | legal | | | |
| $01_{16}$ | na_10×13_envelope | na_9×12_envelope | na_numer_ID envelope | na_7×9_envelope | na_9×11_envelope | na_10×14_envelope | na_10×15_envelope |
| $02_{16}$ | a | b | c | d | e | reserved | |
| $03_{16}$ | iso a0 | iso a1 | iso a2 | iso a3 | iso a4 | iso a5 | iso a6 | iso a7 |
| $04_{16}$ | iso a8 | iso a9 | iso a10 | | | Reserved | | |
| $05_{16}$ | iso b0 | iso b1 | iso b2 | iso b3 | iso b4 | iso b5 | iso b6 | iso b7 |
| $06_{16}$ | iso b8 | iso b9 | iso b10 | | | Reserved | | |
| $07_{16}$ | iso c0 | iso c1 | iso c2 | iso c3 | iso c4 | iso c5 | iso c6 | iso c7 |
| $08_{16}$ | iso c8 | iso_designated | | | reserved | | | |
| $09_{16}$ | jis b0 | jis b1 | jis b2 | jis b3 | jis b4 | jis b5 | jis b6 | jis b7 |
| $0A_{16}$ | jis b8 | jis b9 | jis b10 | reserved | | reserved | | |
| $0B_{16}$ | index_4×6 | index_5×8 | reserved | | japanese_hagaki | japanese_oufuku_hagaki | reserved | |

FIG.20

| Value | Symbol | Meaning | Width | Height |
|---|---|---|---|---|
| $00_{16}$ | device_dependent | The paper alze will be used as device dependent | – | – |
| $01_{16}$ | other | other | | |
| $10_{16}$ | letter | North American letter size | 8.5 inch | 11 inch |
| $11_{16}$ | legal | North American letter size | 8.5 inch | 14 inch |
| $20_{16}$ | na_10×13_envelope | North American 10×13 envelope size | 10 inch | 13 inch |
| $21_{16}$ | na_9×12_envelope | North American 9×12 envelope | 9 inch | 12 inch |
| $22_{16}$ | na_number_10_envelope | North American number 10busines envelope | 4.125 inch | 9.5 inch |
| $23_{16}$ | na_7×9_envelope | North American 7×9 | 7 inch | 9 inch |
| $24_{16}$ | na_9×11_envelope | North American 9×11 | 9 inch | 11 inch |
| $25_{16}$ | na_10×14_envelope | North American 10×14 envelope | 10 inch | 14 inch |
| $26_{16}$ | na_6×9_envelope | North American 6×9 envelope | 6 inch | 9 inch |
| $27_{16}$ | na_10×15_envelope | North American 10×15 envelope | 10 inch | 15 inch |
| $30_{16}$ | a | engineering A | 8.5 inch | 11 inch |
| $31_{16}$ | b | engineering B | 11 inch | 17 inch |
| $32_{16}$ | c | engineering C | 17 inch | 22 inch |
| $33_{16}$ | d | engineering D | 22 inch | 34 inch |
| $34_{16}$ | e | engineering E | 34 inch | 44 inch |
| $40_{16}$ | iso a0 | ISO A0 | 841mm | 1189mm |
| $41_{16}$ | iso a1 | ISO A1 | 594mm | 841mm |
| $42_{16}$ | iso a2 | ISO A2 | 420mm | 594mm |
| $43_{16}$ | iso a3 | ISO A3 | 297mm | 420mm |
| $44_{16}$ | iso a4 | ISO A4 | 210mm | 297mm |
| $45_{16}$ | iso a5 | ISO A5 | 148mm | 210mm |
| $46_{16}$ | iso a6 | ISO A6 | 105mm | 148mm |
| $47_{16}$ | iso a7 | ISO A7 | 74mm | 105mm |
| $48_{16}$ | iso a8 | ISO A8 | 52mm | 74mm |
| $49_{16}$ | iso a9 | ISO A9 | 37mm | 52mm |
| $4A_{16}$ | iso a10 | ISO A10 | 26mm | 37mm |

FIG.21

| Value | Symbol | Meaning | Width | Height |
|---|---|---|---|---|
| $50_{16}$ | iso b0 | ISO B0 | 1000mm | 1414mm |
| $51_{16}$ | iso b1 | ISO B1 | 707mm | 1000mm |
| $52_{16}$ | iso b2 | ISO B2 | 500mm | 707mm |
| $53_{16}$ | iso b3 | ISO B3 | 353mm | 500mm |
| $54_{16}$ | iso b4 | ISO B4 | 250mm | 353mm |
| $55_{16}$ | iso b5 | ISO B5 | 176mm | 250mm |
| $56_{16}$ | iso b6 | ISO B6 | 125mm | 176mm |
| $57_{16}$ | iso b7 | ISO B7 | 88mm | 125mm |
| $58_{16}$ | iso b8 | ISO B8 | 62mm | 88mm |
| $59_{16}$ | iso b9 | ISO B9 | 44mm | 62mm |
| $5A_{16}$ | iso b10 | ISO B10 | 31mm | 44mm |
| $60_{16}$ | iso c0 | ISO C0 | 917mm | 1297mm |
| $61_{16}$ | iso c1 | ISO C1 | 648mm | 917mm |
| $62_{16}$ | iso c2 | ISO C2 | 458mm | 648mm |
| $63_{16}$ | iso c3 | ISO C3 | 324mm | 458mm |
| $64_{16}$ | iso c4 | ISO C4 | 229mm | 324mm |
| $65_{16}$ | iso c5 | ISO C5 | 162mm | 229mm |
| $66_{16}$ | iso c6 | ISO C6 | 114mm | 162mm |
| $67_{16}$ | iso c7 | ISO C7 | 81mm | 114mm |
| $68_{16}$ | iso c8 | ISO C8 | 57mm | 81mm |
| $69_{16}$ | iso deaignated | ISO Dealgnated Long | 110mm | 220mm |
| $70_{16}$ | jis b0 | JIS B0 | 1030mm | 1456mm |
| $71_{16}$ | jis b1 | JIS B1 | 728mm | 1030mm |
| $72_{16}$ | jis b2 | JIS B2 | 515mm | 728mm |
| $73_{16}$ | jis b3 | JIS B3 | 364mm | 515mm |
| $74_{16}$ | jis b4 | JIS B4 | 257mm | 364mm |
| $75_{16}$ | jis b5 | JIS B5 | 182mm | 257mm |
| $76_{16}$ | jis b6 | JIS B6 | 128mm | 182mm |
| $77_{16}$ | jis b7 | JIS B7 | 91mm | 128mm |
| $78_{16}$ | jis b8 | JIS B8 | 64mm | 91mm |
| $79_{16}$ | jis b9 | JIS B9 | 45mm | 64mm |
| $7A_{16}$ | jis b10 | JIS B10 | 32mm | 45mm |
| $80_{16}$ | index 4×6 | North American Index card 4"×6" | 4 inch | 6 inch |
| $81_{16}$ | index 5×8 | North American Index card 5"×8" | 5 inch | 8 inch |
| $90_{16}$ | Japanese_hagaki | JapaneseHagakiPostcard | 100mm | 148 mm |
| $91_{16}$ | Jpanese_oufuku_hagaki | JapaneseOufukuHagaki Postcard | 148mm | 200mm |

FIG.22

| Symbol | Meaning |
|---|---|
| device_dependent | The image output will be sized as device dependent. (Mandatory) |
| economy | PRIORITY ON SPEED |
| normal | NORMAL |
| best | PRIORITY ON PICTURE QUALITY |

FIG.24

| Symbol | Meaning |
|---|---|
| device_dependent | The image output will be sized as device dependent. (Mandatory) |
| mono | WHITE-BLACK PRINTING |
| color | COLOR PRINTING |

FIG.26

| Symbol | Meaning |
|---|---|
| device_dependent | The image output will be sized as device dependent. |
| black_white | BLACK-WHITE PRINTING |
| mono | BLACK-WHITE PRINTING (GRAY SCALE) |
| color | COLOR PRINTING |

FIG.28

| Symbol | Meaning |
|---|---|
| Offset_top<br>Offset_left | $X000_{16} \sim X999_{16}$ : OFFSET POSITION PACKED WITH BCD (00.0 ~99.9mm, $X=0_{16}$ : PLUS (FORWARDS INNER SIDE OF SHEET), $X=8_{16}$ : MINUS (FORWARDS OUTER SIDE OF SHEET))<br>$FFFF_{16}$ : device_dependent |

FIG.30

| Symbol | Meaning |
|---|---|
| Layout_type | $00000000_{16} \sim 0FFFFFFF_{16}$ : LAYOUT TYPE<br>$FFFFFFFF_{16}$ : device_dependent |

FIG.32

| operand | msb　　　　　　　　　　　　　lsb |
|---|---|
| operand | IMAGE MODE EX (XX$_{16}$) |
| operand [0] | subfunction |
| operand [1] | status |
| operand [2] | reserved |
| operand [3] | |
| operand [4] | |
| operand [5] | print_job_ID |
| ⋮ | |
| operand [16] | |
| operand [17] | pic |
| operand [18] | Char_form |
| ⋮ | |
| operand [33] | |
| operand [34] | image_made_ex_parameters |
| operand [35] | |
| operand [36] | |
| operand [37] | |
| operand [38] | |
| operand [39] | |
| operand [40] | |

FIG.33

| address offset | msb | | | | | | | lsb |
|---|---|---|---|---|---|---|---|---|
| $00_{16}$ | type | | | | | | | |
| $01_{16}$ | reserved | | | | | | | |
| $02_{16}$ | | | | | | | | |
| $03_{16}$ | | | | | | | | |
| $04_{16}$ | style | | | | | | | |
| $05_{16}$ | reserved | | | | | | | |
| $06_{16}$ | | | | | | | | |
| $07_{16}$ | | | | | | | | |
| $08_{16}$ | size | | | | | | | |
| $09_{16}$ | color | | | | | | | |
| $0A_{16}$ | | | | | | | | |
| $0B_{16}$ | | | | | | | | |
| $0C_{16}$ | attribute | | | | | | | |
| $0D_{16}$ | reserved | | | | | | | |
| $0E_{16}$ | | | | | | | | |
| $0F_{16}$ | | | | | | | | |

FIG.34

| address offset | msb | | | | | | lsb |
|---|---|---|---|---|---|---|---|
| $00_{16}$ | Device_dependent | Min_dynasty character | gothic | Kai_sho character | round gothic | POP | Reserved |

FIG.35

| address offset | msb | | | | lsb |
|---|---|---|---|---|---|
| $00_{16}$ | device_dependent | auto | off | manual | reserved |
| $01_{16}$ | color_space | | | | |
| $02_{16}$ | brightness | | | | |
| $03_{16}$ | contrast | | | | |
| $04_{16}$ | saturation | | | | |
| $05_{16}$ | sharpness | | | | |
| $06_{16}$ | balance | | | | |
| $07_{16}$ | rendering_intent | | | | |

FIG.38

| symbol | Meaning |
|---|---|
| Device_dependent | The image output will be sized as device dependent. (Handatory) |
| Auto | AUTOMATIC CORRECTION |
| Off | CORRECTION OFF |
| Manual | MANUAL CORRECTION |
| Color_space | COLOR SPACE DESIGNATION<br>$00_{16}$ ; bRGB<br>$01_{16}$ ; ITU-R BT709-2<br>$02_{16}$ ; ITU.R BT.601-2<br>$FF_{16}$ ; Device dependent |
| Brightness | BRIGHTNESS (VALID ONLY IF MANUAL=1) |
| Contrast | CONTRAST (VALID ONLY IF MANUAL=1) |
| saturation | SATURATION/COLOR DENSITY (VALID ONLY IF MANUAL=1) |
| sharpness | SHARPNESS (VALID ONLY IF MANUAL=1) |
| balance | COLOR BALANCE (VALID ONLY IF MANUAL=1) |

FIG.39

| symbol | Meaning |
|---|---|
| device_dependent | The image output will be sized as device dependent. |
| percaptual | PEREEPTUAL (IMAGE) |
| relative_colorimetric | MAINTENANCE OF VELATIVE COLOR RANGE |
| saturation | SATURATION(GRAPHIC) |
| absolute_colorimetric | MAINTENANCE OF ABSOLUTE COLOR RANGE |

FIG.41

METHOD AND DEVICE FOR CONTROLLING THE PRINTING, PRINTER DEVICE, PRINTING METHOD, PRINTING SYSTEM AND PRINTING METHOD

This is a divisional of application Ser. No. 09/660,652, filed Sep. 13, 2000 now U.S. Pat. No. 6,695,494.

BACKGROUND OF THE INVENTION

1. Field of the Invention

This invention relates to a printing system for printing an image by a printing device to which the system is connected over an interface pursuant to IEEE 1394 standard. More particularly, it relates to a printing controlling method and a printing controlling device, a printer device, a printing method and a printing system, in which it is possible to set the quality in printing a text or an image consistent with a user's request.

2. Description of Related Art

The IEEE (The Institute of Electrical and Electronics Engineers) 1394 standard defines physical and electrical standards of connectors provided in respective interconnected equipment. The respective equipment, having an interface pursuant to the IEEE 1394 standard, may be physically interconnected to realize e.g., hot plug and play which automatically sets the high-speed transmission/reception of digital data and interconnection of equipment. So, the IEEE 1394 standard is in widespread use as a standard serial interface reference in the related technical field.

This IEEE 1394 interface is also in widespread use not only in the field of computers but as an interface interconnecting plural AV equipment. Specifically, when a set top box (STB) for receiving satellite broadcast for display on a television device and a printer device for printing an image are interconnected over the IEEE 1394 interface, the STB controls the printer device using a function control protocol (FCP) and an AV/C protocol. The STB and the printer device mount the FCP and the AV/C protocol and are in operation in accordance with an FCP command and an AV/C command.

However, in the printer device having the above-mentioned IEEE 1394 interface or in the STB controlling the printer device, in which there are prescriptions concerning the method for transmitting data representing an image for printing, there are no prescriptions on the printing image quality, such that there lacks a technique for performing the printing with an image desired by the user.

SUMMARY OF THE INVENTION

It is therefore an object of the present invention to provide a method and a device for controlling the printing, a printer device, a printing method, a printing system and a printing method in which a printing image can be set for printing even in the case of an equipment in which interconnection is via an interface pursuant to the IEEE 1394 standard.

In one aspect, the present invention provides a printing control device including picture processing means for processing picture signals supplied from outside to generate picture data, control information generating means for generating the printing control information containing at least one of the text printing image information indicating the picture processing contents for a text for printing by a printer device and the picture printing image information indicating the picture processing contents for a picture for printing by the printer device, outputting means for outputting the picture data generated by the picture processing means and the printing control information generated by the control information generating means to the printing device, as the picture data and the printing control information are contained in a packet pursuant to the IEEE (The Institute of Electrical and Electronics Engineers) 1394 standard, and picture printing control means for managing control so that the picture data contained in the packet sent from the outputting means to the printer device will be printed in accordance with the printing control information.

In this printing control device, picture processing is executed in the printer device, responsive to the text printing image information and the picture printing image information as set, to effect the printing.

In another aspect, the present invention provides a printing controlling method including processing picture signals input from outside to generate picture data, generating the printing control information containing at least one of the text printing image information indicating the picture processing contents for a text at the time of printing by a printer device and the picture printing image information indicating the picture processing contents for a picture at the time of printing by the printer device, outputting the picture data and the printing control information to the printing device as the picture data and the printing control information are contained in a packet pursuant to the IEEE (The Institute of Electrical and Electronics Engineers) 1394 standard, and managing control so that the picture data contained in the packet sent to the printer device will be printed in accordance with the printing control information.

In this printing control method, picture processing is executed in the printer device, responsive to the text printing image information and the picture printing image information as set, to effect the printing.

In still another aspect, the present invention provides a printing device including inputting means fed with picture data contained in a packet consistent with the IEEE (The Institute of Electrical and Electronics Engineers) 1394 standard and the printing control image information containing at least one of the text printing image information indicating the picture processing contents for a text at the time of printing and the picture printing image information indicating the picture processing contents for a picture at the time of printing, printing means for printing a picture indicated by picture data fed to the inputting means in accordance with the printing control information, and printing control means for transforming the picture data fed to the inputting means into a signal format with which the picture data are printed by the printing means, and for causing printing by the printing means.

In this printing device, in printing the text or the picture represented by the picture data contained in a packet pursuant to the IEEE 1394 standard, picture processing is performed for transforming the text or the image depending on the text printing image information or on the picture printing image information as set to effect processing.

In still another aspect, the present invention provides a printing method including inputting picture data contained in a packet consistent with the IEEE (The Institute of Electrical and Electronics Engineers) 1394 standard and the printing control information containing at least one of the text printing image information indicating the picture processing contents for a text at the time of printing and the picture printing image information indicating the picture processing contents for a picture at the time of printing, transforming input picture data into signals of a signal format for printing and printing a picture indicated by the input picture data in accordance with the printing control information.

In this printing method, in printing the text or the picture represented by the picture data contained in a packet pursuant to the IEEE 1394 standard, picture processing is performed for transforming the text or the image depending on the text printing image information or on the picture printing image information as set to effect processing.

In still another aspect, the present invention provides a printing system including printing control device including in turn picture processing means for processing picture signals supplied from outside to generate picture data, control information generating means for generating the printing control information containing at least one of the text printing image information indicating the picture processing contents for a text at the time of printing by a printer device and the picture printing image information indicating the picture processing contents for a picture at the time of printing by the printer device, outputting means for outputting the picture data generated by the picture processing means and the printing control information generated by the control information generating means to the printing device, as the picture data and the printing control information are contained in a packet pursuant to the IEEE (The Institute of Electrical and Electronics Engineers) 1394 standard, and picture printing control means for managing control so that the picture data contained in the packet sent from the outputting means to the printer device will be printed in accordance with the printing control information, and a printer device including inputting means fed from the printer control device with picture data contained in a packet pursuant to the IEEE 1394 standard, and with the printing control information containing at least one of the text printing image information and the picture printing image information, printing means for printing a picture indicated by picture data fed to the inputting means in accordance with the printing control information, and printing control means for transforming the picture data fed to the inputting means into a signal format with which the picture data are printed by the printing means, and for causing printing by the printing means.

In this printing system, in transmitting/receiving packets between equipment interconnected over the IEEE 1394 interface to print picture data, picture printing in meeting with the text printing information or the picture printing image information is performed on the picture data on the printer device to print the text or pictures.

In still another aspect, the present invention provides a printing method including processing picture signals input from outside to generate picture data, generating the printing control information containing at least one of the text printing image information indicating the picture processing contents for a text at the time of printing and the picture printing image information indicating the picture processing contents for a picture at the time of printing, outputting the picture data and the printing control information contained in a packet pursuant to the IEEE (The Institute of Electrical and Electronics Engineers) 1394 standard, inputting to a printing device the picture data contained in the packet pursuant to the IEEE 1394 standard and the picture control information containing at least one of the text printing image information and the picture printing image information, transforming the input picture data into a signal format with which the data are printed, and printing the input picture data in accordance with the printing control information.

In this printing method, in transmitting/receiving packets between equipment interconnected over the IEEE 1394 interface to print picture data, picture printing in meeting with the text printing information or the picture printing image information is performed on the picture data on the printer device to print the text or pictures.

In yet another aspect, the present invention provides a television receiver including a reception unit for receiving picture signals, a picture processing unit for processing the picture signals to generate picture data, a setting unit for setting at least one of the text printing image information indicating the picture processing contents for a letter at the time of printing by a printer device and the picture printing image information indicating the picture processing contents for a picture at the time of printing by the printer device, a control information generating unit for generating the printing control information containing at least one of the text printing image information and the picture printing image information as set by the setting unit, and an outputting unit for outputting the picture data generated by the picture processing unit and the picture control information generated by the control information generating unit, in a form in which the picture data and the picture control information are contained in a FCP consistent with the IEEE 1394 standard.

According to the present invention, as described above, the picture data and the text or picture printing image information at the time of printing the picture or the text indicated by the picture data are contained in a packet and transmitted in this form to enable the setting of the printing image to effect printing even in case of the equipment interconnected by an interface pursuant to the IEEE 1394 standard.

BRIEF DESCRIPTION OF THE DRAWINGS

FIG. 6 illustrates an image type of a still image.

FIG. 7 illustrates a data structure of an asynchronous packet containing a capture command.

FIG. 8 illustrates the appellation of an image type stored in image_format_specifier.

FIG. 9 illustrates plane-sequentially transmitting a still image with an image type of 480_422_4×3.

FIG. 10 illustrates plane-sequentially transmitting a still image with an image type of 480_420_4×3.

FIG. 11 illustrates line-sequentially transmitting a still image with an image type of 480_422_4×3.

FIG. 12 illustrates line-sequentially transmitting a still image with an image type of 480_420_4×3.

FIG. 13 illustrates a data structure of an asynchronous packet containing an operation mode 2 command.

FIG. 14 illustrates the contents of the subfunction contained in the operation mode 2 command.

FIG. 15 illustrates the contents of the Operation_mode 2_parameters contained in the operation mode 2 command.

FIG. 17 illustrates the meaning and contents of respective setting items contained in media_type.

FIG. 18 illustrates the contents of the media_size contained in the Operation_mode 2_parameters.

FIG. 19 illustrates the meaning and contents of respective setting items contained in media_size.

FIG. 20 illustrates another example of the meaning and contents of respective setting items contained in media_size.

FIG. 21 illustrates another example of the meaning and contents of respective setting items contained in the media_size.

FIG. 22 illustrates the contents of the print_quality contained in the Operation_mode 2_parameters.

FIG. 24 illustrates the contents of the mono_color contained in the Operation_mode 2_parameters.

FIG. 26 illustrates another example of the mono_color contained in the Operation_mode 2_parameters.

FIG. 28 illustrates the contents of the offset contained in the Operation_mode 2_parameters.

FIG. 30 illustrates the contents of the layout_type contained in the Operation_mode 2_parameters.

FIG. 32 illustrates a data structure of a command packet containing an operation mode command.

FIG. 33 illustrates a data structure of a command packet containing an operation mode command.

FIG. 34 illustrates respective setting items contained in the Type of the Char_form of a command packet containing an image mode command.

FIG. 35 illustrates respective setting items contained in the Type of the Char_form of the command packet containing the image mode command.

FIG. 38 illustrates respective setting items contained in the image_mode_ex_parameters of the Char_form of the command packet containing the image mode command.

FIG. 39 illustrates the meaning and contents of respective setting items contained in the image_mode_ex_parameters of the Char_form of the command packet containing the image mode command.

FIG. 41 illustrates the meaning and contents of respective setting items contained in the rendering_intent of the image_mode_ex_parameters of the Char_form of the command packet containing the image mode command.

DESCRIPTION OF THE PREFERRED EMBODIMENTS

Figure 1:
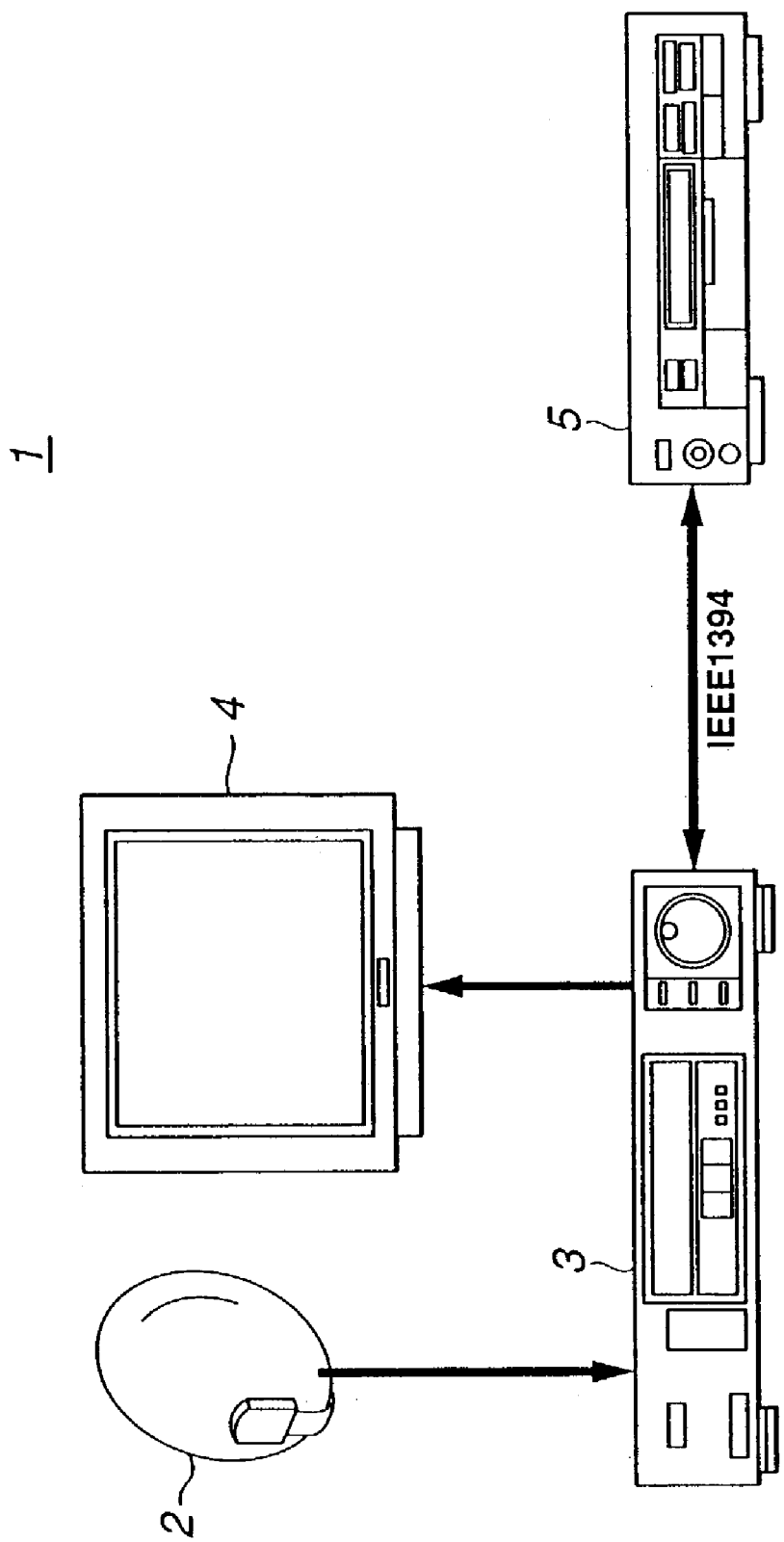
FIG. 1 illustrates an image printing system according to the present invention.

Referring to the drawings, preferred embodiments of according to the present invention will be explained in detail.

An image printing system 1, according to the present invention, is configured as shown for example in FIG. 1.

The image printing system 1 includes an antenna 2 for receiving moving pictures, broadcast using e.g., a communication satellite, a set top box (STB) 3 for processing the received moving picture data in a pre-set fashion, a television device 4 for displaying moving and still pictures and a printer device 5 for printing and outputting an image.

The antenna 2 receives the image signals indicating a moving picture. The image signals, received by the antenna 2, are superposed multi-channel image signals. The moving picture data are compressed in accordance with e.g., the MPEG (Moving Picture Experts Group) system, and are encrypted in accordance with a pre-set encryption system.

The television device 4 is fed with moving picture data of the NTSC (National Television System Committee) system over the STB 3 to display a moving picture. In case of HDTV, the television device 4 is fed from the STB 3 with moving picture data pursuant to the HD (high definition) standard to display a moving picture. Moreover, the television device 4 is controlled in its display state by the STB 3 to display a still image or text information.

Figure 2:
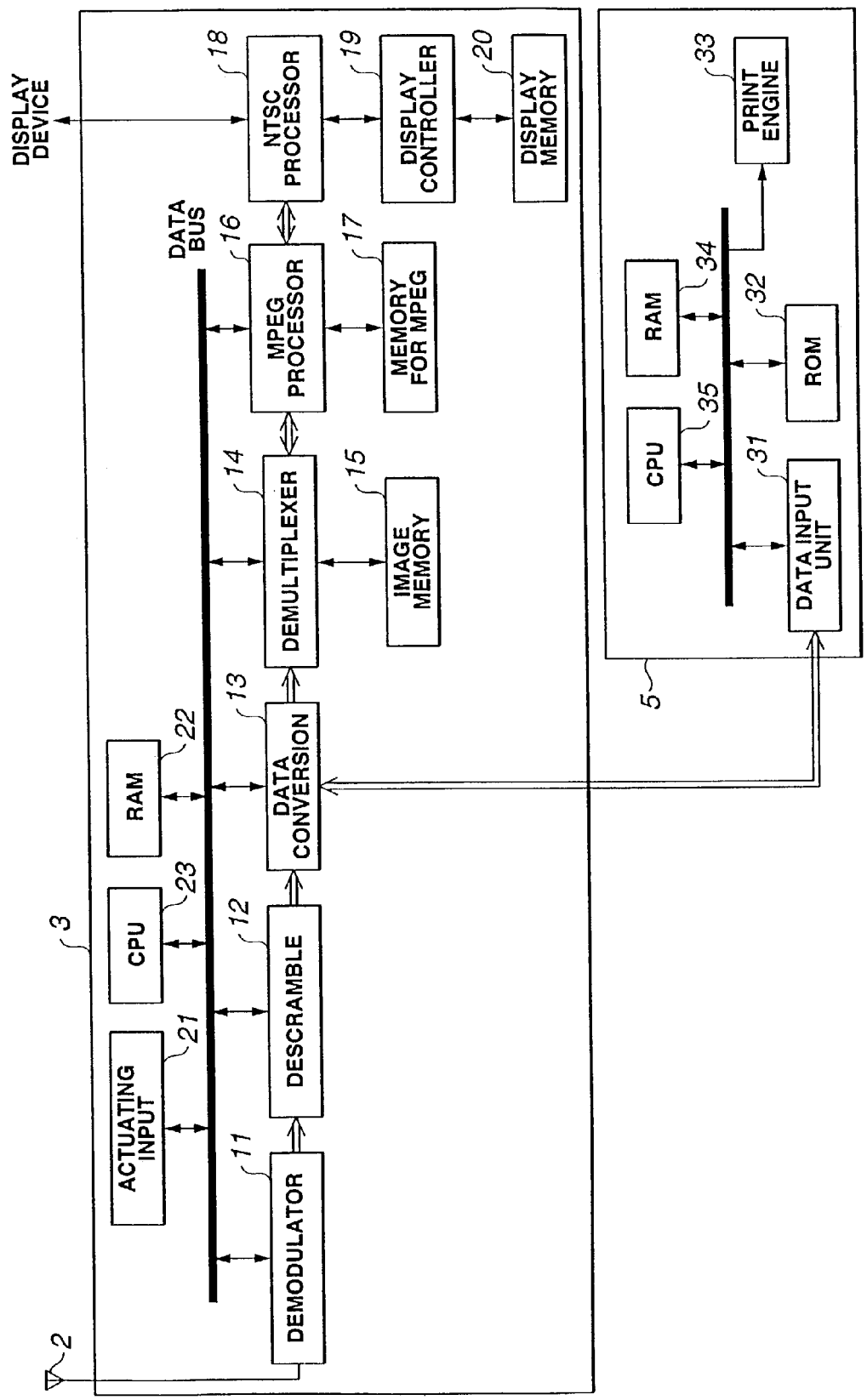
FIG. 2 is a block diagram showing the structure of an STB and a printer device making up the image printing system according to the present invention.

Referring to FIG. 2, the STB 3 includes a demodulator 11 for demodulating picture signals received over the antenna 2, a descrambler 12 for decrypting moving picture data, a data conversion unit 13 for performing data conversion pursuant to IEEE 1394 standard, and a demultiplexer 14 for extracting moving picture data for a pre-set channel. The STB 3 also includes an image memory 15, an MPEG processor 16 for decoding, a decoding memory 17 and an NTSC encoder 18 for conversion to data configured for screen display on the television device 4. Moreover, the STB 3 includes a display controller 19, a display memory 20, an actuating input unit 21, fed with a command from a user, a RAM (random access memory) 22 and a CPU (central processing unit) 23 for controlling various components.

In this STB 3, the demodulator 11, descrambler 12, data conversion unit 13, demultiplexer 14, MPEG processor 16, actuating input unit 21, RAM 22 and the CPU 23 are connected to a bus. The processing of the various components is controlled over the bus by the CPU 22.

The demodulator 11 is fed over the antenna 2 with image signals of the analog system, representing a moving picture stream. The demodulator 11 demodulates and A/D converts the picture signals from the antenna 2 to output the converted signals to the descrambler 12 as moving picture data of the digital system. The demodulator 11 is fed through a bus with control signals from the CPU 23 to perform demodulation and A/D conversion based on these control signal.

The demodulator 12 decrypts the moving picture data from the demodulator 11. That is, the descrambler 12 is fed with encrypted moving picture data to proceed to decryption in accordance with the encryption system of the input moving picture data. The descrambler 12 outputs moving picture data, processed with decryption, to the data conversion unit 13. This descrambler 12 is fed with control signal from the CPU 23 over the bus to proceed to decryption using e.g., the encryption key information contained in the control signal.

The data conversion unit 13 is comprised of an interfacing circuit, pursuant to e.g., the IEEE 1394 standard, and performs signal processing pursuant to the IEEE 1394 standard on the moving picture data from the descrambler 12 to have the input moving picture data or input still image data contained in a packet pursuant to the IEEE 1394 standard. It is noted that the data conversion unit 13 performs the processing of generating an isochronous packet when transmitting temporally consecutive data, such as moving picture data, while performing the processing of generating an asynchronous packet 100, shown in FIG. 3, when transmitting static data, such as still image data or command or data for connection setting.

Figures 3, 4:
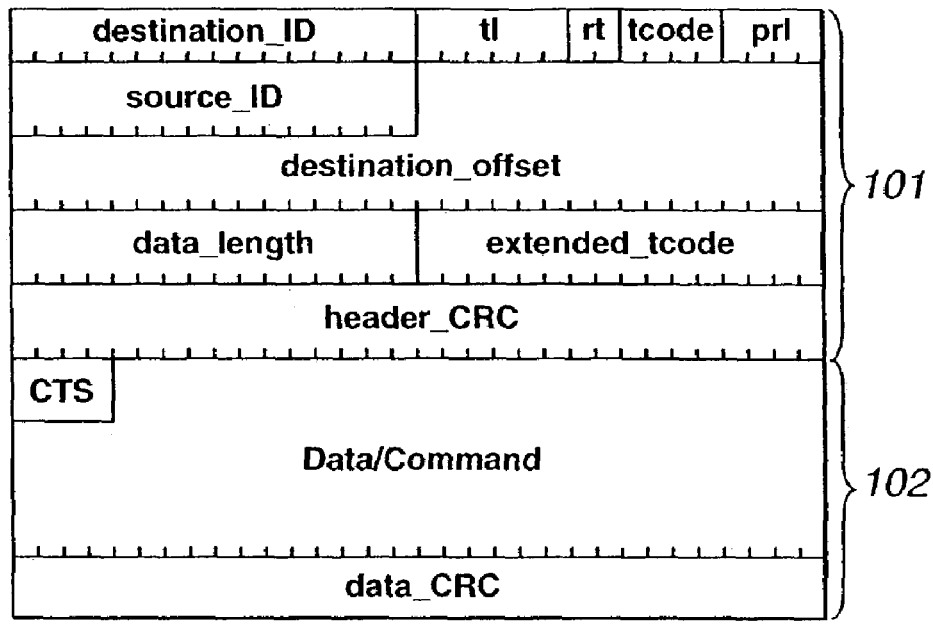
FIG. 3 illustrates a data structure of a data portion of an asynchronous packet exchanged between the STB and the printer device.
FIG. 4 illustrates a data structure of the data portion of the asynchronous packet.

The asynchronous packet 100, shown in FIG. 3, includes a header 101 and a data portion 102, pursuant to the IEEE 1394 standard.

In the header 101 are stored an ID for the packet receiving side, that is a receiving side ID indicating an ID of the printer device 5(destination_ID), a label for a destination of transmission (tl: transaction label), a re-send code (rt: retry code), a transfer code (tcode: transaction code), priority (Pri: priority), a packet transmitting side ID, that is a transmitting side ID (source_ID), indicating an ID of the STB 3, a destination_offset, indicating a memory address on the packet receiving side, a data field length (data_length), extended transfer code (extended_tcode: extended transaction code), and a header CRC indicating the CRC for the header 101 (header_CRC: CRC of header field).

In the data portion 102 are stored a data field and a data CRC indicating the CRC for the header 102 (data_CRC). In the data field, there are stored data consistent with the FCP (function control protocol) and with the AV/C protocol.

In the data field, the CTS (Command Transaction Set), a command type (Command type), a subunit type indicating the sort of the subunit on the packet receiving side (subunit_type) and a subunit ID indicating the ID of the subunit on the packet receiving side (subunit_ID). To the subunit on the packet receiving side corresponds a data input unit 31 of the printer device 5, and the sort of the subunit on the packet receiving side is represented by "00010" in the case of the printer device 5.

In the data field, still image data (data) to be transmitted to the printer device 5, and an AV/C command for the printer device 5 are stored next to the subunit ID. The command stored in the data field is a command contained in a command set, termed an AV/C command, used for controlling the printer device 5. The CTS classifies the sorts of the FCP, such that, if the packet transmitted is a command, and the value is 0000, the AV/C command, defined by the AV/C Digital Interface Command Set of IEEE 1394, is stored in the data field of the data portion 102.

When outputting an isochronous packet to outside, the data conversion unit 13 transmits isochronous packets at regular intervals.

Figure 5:
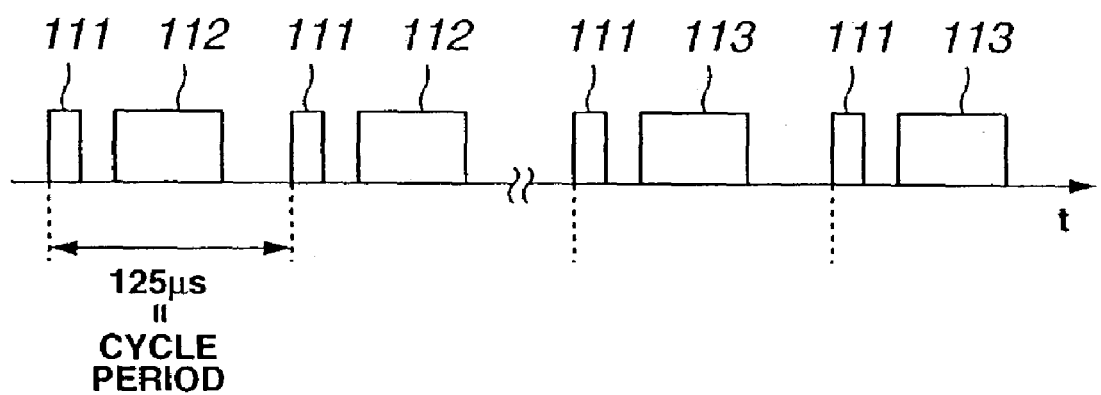
FIG. 5 is a timing chart in case of transmitting an asynchronous packet from a data transformation unit to a data inputting unit.

When the still image data, printed by the printer device 5, is contained in the asynchronous packet 100 and transmitted, the data conversion unit 13 transmits the asynchronous packet 100 at a cycle period of 125 μsec, as shown in FIG. 5. First, the data conversion unit 13 sends a cycle start packet 111, as the asynchronous packet 100 containing a cycle time data (cycle_time_data) indicating the cycle start (Cycle-_start) in the header 101. After a gap of a pre-set time, the data conversion unit 13 sends a command packet 112 containing in its data portion 102 a capture command indicating the effect that still image data, for example, is to be sent. The data conversion unit 13 then sends a data packet 113, having still image data stored in its data portion 102, to the printer device 5, which has received the capture command, at a cycle period.

If the still image data is to be outputted to the printer device 5, the data conversion unit 13 acts in conformity to asynchronous arbitration. That is, when outputting still image data to the printer device 5, the data conversion unit 13 outputs each asynchronous packet 100, containing still image data, in accordance with a response from the printer device 5.

Specifically, the data conversion unit 13 performs processing in a transaction layer, a link layer and in a physical layer, under supervision by a serial bus, in accordance with the IEEE 1394 standard. Thus, the data conversion unit 13 establishes connection to the printer device 5, under control by the CPU 23, while generating an asynchronous packet 100, containing an overhead, as the control information, and the still image data, to transmit the asynchronous packet 100 to the printer device 5 connected in circuit in accordance with the IEEE 1394 standard, at each cycle period, by way of performing time divisional control.

On the other hand, if the data conversion unit 13 directly displays the moving picture data, received by the STB 3, without doing processing by the television device 4 pursuant to the IEEE 1394 standard, the data conversion unit 13 outputs the moving picture data from the descrambler 12 to the demultiplexer 14, based on the control signal from the CPU 23.

The demultiplexer 14 performs the processing of sorting a channel, designated by the CPU 23, from plural channels superposed on the moving picture data from the data conversion unit 13, to output only moving picture data, indicating the specified channel, to the MPEG processor 16.

The demultiplexer 14 is also fed from the MPEG processor 16 with still image data, comprised of the luminance information and the chrominance information, under control by the CPU 23. The still image data is stored in the image memory 15 and output to the data conversion unit 13 under control by the CPU 23.

Based on the control signal from the CPU 23, the MPEG processor 16 decodes the moving picture data from the multiplexer 14, pursuant to the MPEG standard, to produce non-compressed moving picture data, which is output to the NTSC encoder 18. Thus, the MPEG processor 16 renders each frame constituting the moving picture into an image composed of pixel data containing the luminance information (Y) and the chrominance signal Cr, Cb. This image is referred to below as a YCC image. The MPEG processor 16 uses the moving picture data, composed of plural frames as units, as the object of decoding, as a work area, as these moving picture data are incidentally stored in a memory for MPEG 17.

The MPEG processor 16 generates a YCC image of a pixel format in which the sampling frequency ratio of the luminance information Y, chrominance signal Cr and the chrominance information Cb is set to 4:2:2, that is in which the chrominance information Cr and Cb is diminished in the vertical direction or in the horizontal direction to one half the luminance information Y. The MPEG processor 16 also generates a YCC image of a 4:2:0 pixel format in which the chrominance information Cr, Cb is reduced in the vertical direction and in the horizontal direction to one half of the luminance information Y. In the 4:2:0 pixel format, the chrominance information Cb is not contained in the odd lines to give the sampling frequency ratio of 4:2:0, whilst the chrominance information Cr is not contained in the even line to give the sampling frequency ratio of 4:0:2. The 4:2:0 format is so termed by using the former as representative appellation. It is also possible with the present MPEG processor 16 to generate a YCC image of the 4:4:4 pixel format, in which the chrominance information Cr, Cb is not curtailed, in place of the above-described 4:2:2 or 4:2:0 pixel format.

The MPEG processor 16 encodes the moving picture data from the NTSC encoder 18, in accordance with the MPEG standard, based on the control signal from the CPU 23 indicating e.g., the compression ratio, to compress the moving picture data in the time axis direction and in the spatial direction, to output the compressed moving picture data to the demultiplexer 14. At this time, the MPEG processor 16 stores moving picture data, in terms of plural frames to be encoded as a unit, in the memory for MPEG 17.

The NTSC encoder 18 encodes the moving picture data, input from the MPEG processor 16, so that these moving picture data will be moving picture data of the NTSC system, that can be demonstrated on a screen, to output the resulting data to the television device 4.

The display controller 19 encodes the moving picture data, input from the MPEG processor 16, into NTSC moving picture data that can be displayed on a screen of the television device 4. At this time, the display controller 19 incidentally stores data to be processed on the display memory 20.

Specifically, the display controller 19 controls the image size displayed on the television device 4, in terms of a frame constituting moving picture data as a unit, to be 720 pixels by 480 pixels according to the NTSC system or 1920 horizontal pixels by 1080 vertical pixels according to the high definition (HD) system, depending on the type of the television device 4. The display controller 19 operates to output the 16-bit information by the pixel format in which the sampling frequency ratio between the luminance signals Y and chrominance signals Cb, Cr is set to 4:2:2, or the information by the pixel format in which the sampling frequency ratio between the luminance signals Y and chrominance signals Cb, Cr is set to 4:2:0, to the television device 4, in generating pixel data.

Instead of outputting the information to the television device 4 in accordance with the above-described system, the display controller 19 may also generate an image of the image type which gives the definition of the image size (pixel_x, pixel_y), scanning system (interlaced/progressive), pixel format, screen aspect ratio, pixel aspect ratio and data volume (image size), as shown in FIG. 6. In FIG. 6, an image type in which pixel_y is 720 pixels, the pixel format is 4:2:2 and the screen aspect ratio is 16:9 is termed 720_422_16×9. The display controller 19 is able to generate a still image of 720_422_16×9 and 720_420_16×9, which is an image type of the digital TV broadcasting system employed in USA.

The actuating input unit 21 is acted on by an actuating button provided in the STB 3 to generated an actuating input signal which is output to the television device 4. Specifically, the actuating input unit 21 generates an actuating input signal by user operation for transiently pausing the moving picture displayed on the television device 4 to print the still image by the printer device 5.

When the actuating input signal for printing a still image by the printer device 5, the actuating input unit 21 generates and outputs to the CPU 23 an actuating input signal specifying printing sheet type setting, printing sheet size setting, printing quality setting, printing color setting, position offset setting, layout setting, and setting provided as text printing image information and picture printing image information, depending on a printing setting picture displayed on the television device 4.

Based on the actuating input signal from the actuating input unit 21, the CPU 23 generates a control signal controlling the above-described components of the STB 3.

When picture signals received over the antenna 2 are displayed on the television device 4, the CPU 23 sends output signals to the demodulator 11, descrambler 12, data conversion unit 13, demultiplexer 14 and to the MPEG processor 16 to manage control to demodulate, decrypt, select channels and to decode the moving picture data pursuant to the MPEG standard.

By the actuating input signal from the actuating input unit 21, the CPU 23 also issues a control signal to read into the image memory 15 the frame-based still image data, among moving pictures displayed in the television device 4, which is stored in the display memory 20, at the actuating input signal input timing, when capturing the frame-based still image.

When fed from the actuating input unit 21 with the actuating input signal to the effect that the printing setting or setting of the font image and the picture image is to be made, the CPU 23 controls the display controller 19 to display a printing setting picture on the television device 4 to output the actuating input signal corresponding to the above-mentioned variable printing settings to the data conversion unit 13.

When fed with an actuating input signal to the effect that an image which has yielded still image data is to be printed by the printer device 5, the CPU 23 controls the demultiplexer 14 and the data conversion unit 13 to output a picture as a YCC or RGB picture which is the frame-based still image data stored in the image memory 15 and which is made up of the luminance Y and the chrominance information Cb, Cr.

When the still image data is to be output to the printer device 5, the data conversion unit 13 sends an asynchronous packet 100, including capture command shown in FIG. 7, following the subunit ID shown in FIG. 4, to the printer device 5, under control by the CPU 23, to transmit a capture command for receiving the still image data to the printer device 5.

In the capture command, shown in FIG. 7, a capture (CAPTURE) command, represented in $xx_{16}$ in hexadecimal notation, is stored as an opcode (operation code). Next, a subfunction is stored as operand [0]. The source_subunit_type and the source_subunit_ID are stored in the upper five bits and in the lower three bits, respectively, as the operand [1]. Then, the source_plug, status and the dest_plug are stored as operand [2], operand [3] and as operand [4], respectively. Then, the print_job_ID is stored in the capture command as operands [5] to [16], and the data_size is stored in the capture command as operands [17] to [20]. The image_size_x is stored as the operands [21] to [22], the image_size_y is stored as the operands [23] to [24], the image_format_specifier is stored as the operand [25], Next_pic is stored ad the operand [26] and the Next_page is stored as the operands [27] to [28].

It is noted that the source_subunit_type is the information indicating the sort of the subunit transmitting the asynchronous packet 100 from the STB 3. The source_subunit_ID is an ID of the subunit transmitting the asynchronous packet 100, the source_plug is the plug number of the subunit transmitting the asynchronous packet 100, the dest_plug is the plug number of the subunit receiving the asynchronous packet 100, the print_job_ID is an ID of the processing job) of printing a sole still image, the data_size is the volume of data transmitted from the STB 3 to the printer device 5 when printing the still image by the printer device 5, the image_size_x is the number of pixels in the x-direction corresponding to the image type shown in FIG. 6, and the image_size_y is the number of pixels in the y-direction corresponding to the image type. The image_format_specifier is the appellation of the image type. In this image_format_specifier, there are stored the appellations of the image types as distinguished by the numbers of the hexadecimal notation (Value). In FIG. 8, the "plane" in the image type appellation indicates that the image is the still image transmitted plane-sequentially from the data conversion unit 13 to the printer device 5, whilst "line" indicates that the image is the still image transmitted line-sequentially from the data conversion unit 13 to the printer device 5.

After transmitting the asynchronous packet 100, inclusive of the capture command, and receiving the ACK (acknowledge) from the printer device 5, the data conversion unit 13 sends the asynchronous packet 100 containing the still image data to the printer device 5.

When still image data with the image type of 480_422_4×3, having the pixel numbers 0 to 719 in the x-direction and the line numbers 0 to 478 in the y-direction, is included in the asynchronous packet 100 and transmitted to the printer device 5, the image data is transmitted as shown in FIG. 9.

That is, the data conversion unit 13 transmits, next to the address offset (address_offset), the luminance information Y0 (L0), luminance information Y1 (L0), chrominance information Cb0 (L0) and the chrominance information Cr0 (L0) for the pixel number 0 contained in the line number 0. The data conversion unit 13 then sends the luminance information and the chrominance information, contained in the next line number 1 ff., next to the pixel data up to the pixel number 719 contained in the line number 0, until transmitting the pixel data up to the pixel number 719 contained in the line number 479, to complete transmission of the still image data represented a sole still image.

If the image type is 480_420_4×3, the data conversion unit 13 transmits, next to an address offset (address_offset), the chrominance information Cr0 (L0), chrominance information Cb0 (L0) luminance information Y2 (L0), luminance information Y3 (L0), contained in the pixel data having the pixel number 0, after transmitting the luminance information Y0 (L0), luminance information Y1 (L0), luminance information Y0 (L1), luminance information Y1 (L1) for the pixel number 0 contained in the line number 0. The data conversion unit 13 transmits pixel data up to the pixel number 719 contained in the line number 479 to complete the transmission of still image data indicating a sole still image.

When line-sequentially transmitting still image data, with the image type of 480_422_4×3, contained in the asynchronous packet 100, the data conversion unit 13 transmits, next to an address offset (address_offset), the luminance information Y0 (L0), luminance information Y1 (L0), luminance information Y2 (L0), luminance information Y3 (L0), . . . , up to luminance information Y719 (L0), for the line number 0, after which it transmits the chrominance information Cb0 (L0), chrominance information Cr0 (L0), . . . , up to the chrominance information Cb718 (L0), chrominance information Cr718 (L0), for the line number 0, and the luminance information and the chrominance information for the line number 1 ff., until it transmits the chrominance information Cr718 (L479) for the line number 479, to complete transmission of still image data.

When line-sequentially transmitting still image data, with the image type of 480_420_4×3, contained in the asynchronous packet 100, the data conversion unit 13 transmits the luminance information Y0 (L0) up to the luminance information Y719 (L0) for the line number 0, followed by the luminance information Y0 (L1) up to the luminance information Y719 (L1) for the line number 1, followed by the chrominance information Cb0 (L0) and the chrominance information Cr0 (L0) up to the chrominance information Cb718 (L0) and the chrominance information Cr718 (L0) for the line number 0, to transmit pixel data of the line numbers 0 and 1, followed by the luminance information and the chrominance information for the line number 2 ff., until it transmits the chrominance information Cb718 (L478) and the chrominance information Cr718 (L478), to complete transmission of the still image data, as shown in FIG. 12.

If the data conversion unit 13 specifies and prints the font printing image information and the picture printing image information, responsive to the actuating input signal from the actuating input unit 21, it generates a command packet containing an image mode command specifying each setting pertinent to the text printing image information and the picture printing image information.

When the data conversion unit 13 specifies the printing sheet type setting, printing sheet size setting, printing quality setting, printing color setting, position offset setting or layout setting, responsive to the actuating input signal from the actuating input unit 21, to effect printing setting, it stores in the command packet an operation mode 2 (OPERATION MODE 2) parameter, referred to below as the operation mode 2 parameter, contained in the operation mode 2 command of FIG. 13, and which is different from the operation_mode_parameters already proposed in the IEEE 1394 standard, referred to below as the operation mode 1 parameter.

The operation mode 1 parameter is made up of the information setting the size relation between the image and the printing sheet in three stages of large, medium and small (sizing), the information setting the printing direction of the printing sheet (orientations), the information setting the printing position of the image (posx, posy), the information indicating how many of the same images are to be printed in a printing sheet, (multiple_tiled), the information indicating how many images are to be printed on one page (number_of_plies) and the information indicating the number of the printing sheets used for printing (number_of_copies).

In the operation mode 2 command, the information indicating the operation mode 2 (OPERATION MODE 2) command, represented as "51" in hexadecimal notation, is stored as the opcode (operating code). Then, the subfunction is stored as the operand [0], status is stored as the operand [1] and reserved is stored as operands [2] to [4]. Then, print_job_ID is stored as the operands [5] to [16], and the operation mode 2 parameters, indicating the specified printing setting contents of the operation mode 2 command, are stored as the operands [17] to [31].

In the subfunction, there are stored the information represented by 01 in hexadecimal notation and which is termed "get", the information represented by 02 in hexadecimal notation and which is termed "set" or the information represented by 03 in hexadecimal notation and which is termed "query", as shown in FIG. 14.

The data conversion unit 13 stores "get" in the subfunction when acquiring the operation mode 2 parameter specifying the printing setting information of the printer device 5. The data conversion unit 13 stores "set" when setting the operation mode 2 parameter of the printer device 5, while storing "query" when it is desired to know the possible setting range of the operation mode 2 parameter of the printer device 5. If the information is such information other than that specified by 01, 02 and 03 in hexadecimal notation, the subfunction is Reserved.

When responding to the operation mode 2 command from the data conversion unit 13, the data input unit 31 generates an asynchronous packet the contents of the subfunction of which have been changed.

In the operation_mode_2_parameters, the printing paper sheet type information (media_type), the printing paper sheet size information (Media-size), spare area (reserved), printing quality information (Print_quality), printing color information (Mono_color), printing offset position information (offset), and the layout setting information, are stored, as shown in FIG. 15.

Figure 16:
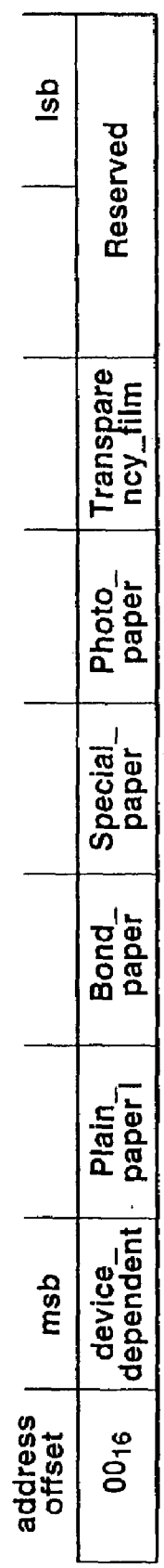
FIG. 16 illustrates the contents of media_type contained in the Operation_mode 2_parameters.

In the printing sheet type information (media_type), one bit is allocated for each setting item and plural setting items are sequentially arrayed, as shown in FIGS. 16 and 17. That is, the device_dependent, Plain_paper (ordinary paper), Bond_paper (seal), Special_paper (dedicated paper), Photo_paper (photo paper sheet) and Transparent_film (OHP film), are sequentially arrayed. The sorts of the printing paper sheets are specified by bits for respective setting items being set by the data conversion unit 13 or by the data input unit 31. If the printing paper sheet is not specified by the user such that the printer device 5 is free to select the sort of the optimum printing paper sheet, a bit for device_dependent is set.

In the printing paper sheet size information (Media_size), device_dependent, A5 (ISO and JIS A5), A4 (ISO and JIS A5), B5 (JIS B5), Executive (US Executive), Letter (US Letter), Reserved, hagaki (postcard), Oufuku_hagaki (return postcard), Authentication server 6 (ISO and JIS Authentication server 6 Card), Index_4×6 (US Index card 4"×6"), Index_5×8 (US Index card 5"×8"), A3 (ISO A3), Base station 4, Lagel_11×17, Commercial10_portrait (US Commercial#10 (portrait)), Commercial#10 landscape (US Commercial#10 (landscape)), DL (International DL), C6 (International C6), A2 (US A2)) and Custom (Custom paper) are stored. This printing paper sheet size information specifies the size of the printing paper sheet by the bits for the respective setting items being set by the data conversion unit 13 or the data input unit 31.

Referring to FIGS. 20 to 22, other examples of the printing paper sheet size information (Media_size) include sequentially stored letter (North American Letter size), having stored therein device_dependent, others and subsequently standardized, legal (North American legal size), na_10×13 envelope (North American 10×13 envelope), na_9×12 envelope (North American 9×12 envelope, na_number_10_envelope (North American 10 business envelope), na_7×9 envelope (North American na_7×9), na_9×11_envelope (North American 9×11), na_10×14 envelope(North American 10×14 envelope), na_6×9 envelope(North American 6×9 envelope), na_10×15 envelope (North American 10×15 envelope), a (engineering A), b (engineering B), c (engineering C), d (engineering D), iso a0 (ISO A0), iso a1 (ISO A1), iso a2 (ISO A2), iso a3 (ISO A3), iso a4 (ISO A4), iso a5 (ISO A5), iso authentication server 6 (ISO Authentication server 6), iso a7 (ISO A7), iso a8 (ISO A8), iso a9 (ISO A9), a10 (ISO A10), b0 (ISO B0), iso b1 (ISO B1), iso b2 (ISO B2), iso b3 (ISO B3), iso base station 4 (ISO Base station 4), iso b5 (ISO B5), iso b6 (ISO B6), iso b7 (ISO B7), iso b8 (ISO B8), iso b9 (ISO B9), b10 (ISO B10), c0 (ISO C0), iso c1 (ISO 1), iso c2 (ISO C2), iso c3 (ISO C3), iso c4 (ISO C4), iso c5 (ISO C5), iso c6 (ISO C6), iso c7 (ISO C7), iso c8 (ISO C8), iso designated (ISO Designated Long), jis b0 (JIS B0), jis b1 (JIS B1), jis b2 (JIS B2), jis b3 (JIS B3), jis base station 4 (JIS Base station 4), jis b5 (JIS B5), jis b6 (JIS B6), jis b7 (JIS B7), jis b8 (JIS B8), jis b9 (JIS B9), jis b10 (JIS B10), index_4×6 (North American Index Card 4"×6"), index_5×8 (North American Index Card 5"×8"), japanese_hagaki (Japanese Hagaki postcard) and japanese_ouhuku_hagaki (Japanese Ouhuku-Hagaki Postcard). The size of the printing paper sheet is specified by the bits of the respective setting items being set by the data conversion unit 13 or by the data input unit 31.

Figure 23:
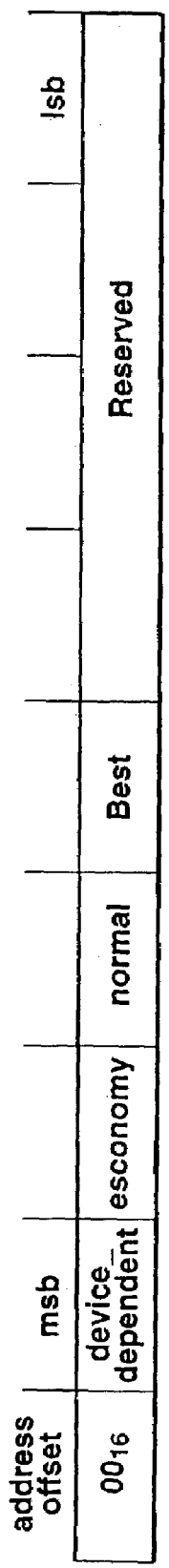
FIG. 23 illustrates the meaning and contents of respective setting items contained in the print_quality.

Referring to FIGS. 23 and 24, device_dependent, economy (priority on speed), normal (ordinary) and best (priority in picture quality) are stored as the printing quality information (Print_quality). This printing quality information specifies the printing quality by the bits on the respective setting items being set by the data conversion unit 13 or by the data input unit 31.

Figure 25:
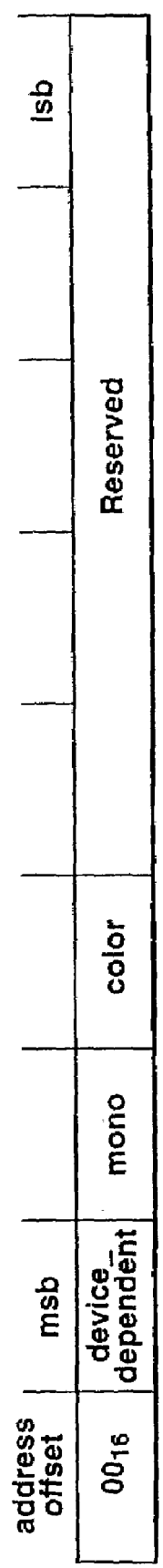
FIG. 25 illustrates the meaning and contents of respective setting items contained in the mono_color.

Referring to FIGS. 25 and 26, device_dependent, mono (monochromatic printing) and color (color printing) are stored as the printing color information (Mono_color). This printing color information specifies the printing color by bits pertinent to each setting item being set by the data conversion unit 13 or the data input unit 31.

Figure 27:
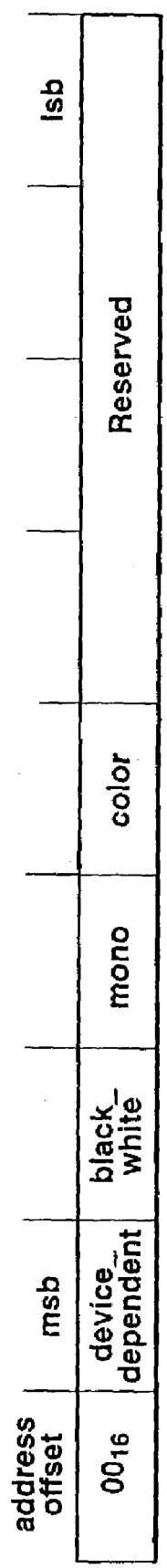
FIG. 27 illustrates another example of the meaning and contents of respective setting items contained in the mono_color.

The other information contained in the printing color information include device_dependent, black_white (gray scale printing), mono (white and black (gray scale) printing) and color (color printing), as shown in FIGS. 27 and 28.

Figure 29:
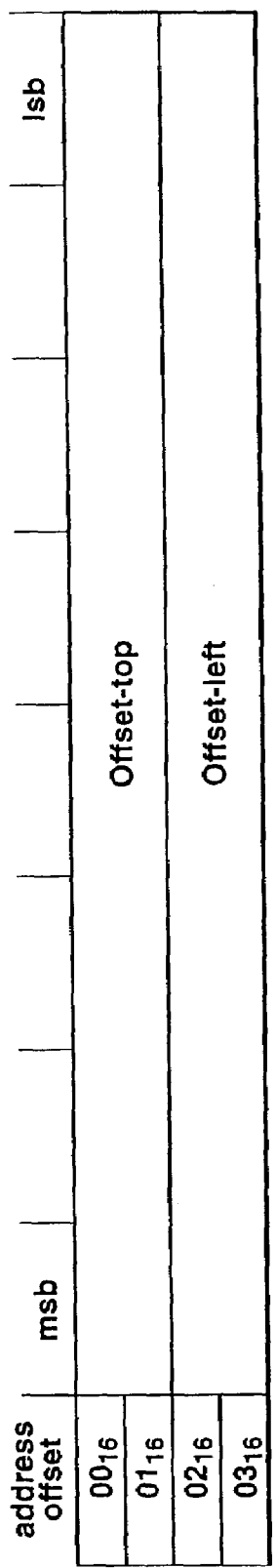
FIG. 29 illustrates the meaning and contents of respective setting items contained in the offset.

The printing offset position information (offset) contains Offset_top and Offset_left, as shown in FIGS. 29 and 30. The Offset_top and Offset_left are represented by hexadecimal numbers between X000 and X999. An offset position is specified by 2 bytes by the binary coded decimal (BCD) system. The hexadecimal number 0 in hexadecimal notation indicates the printing start position in an inward direction, whereas the hexadecimal number 8 in hexadecimal notation indicates the printing start position in an outward direction of the printing sheet. Two of three lower digits represent an integer, with the remaining digit representing sub-radix number. In this manner, an upper left point of origin of a printing sheet is specified in a range of 0.00 mm and 99.9 mm in terms of a width from top and left paper sheet ends to specify the printing start position. The printing offset position information, represented as FFFF in hexadecimal notation, is device_dependent. If the subfunction is qualy inquiring the possible setting range of the operation mode 2 parameter, the maximum possible setting value is stored in the printing offset position information.

Figure 31:
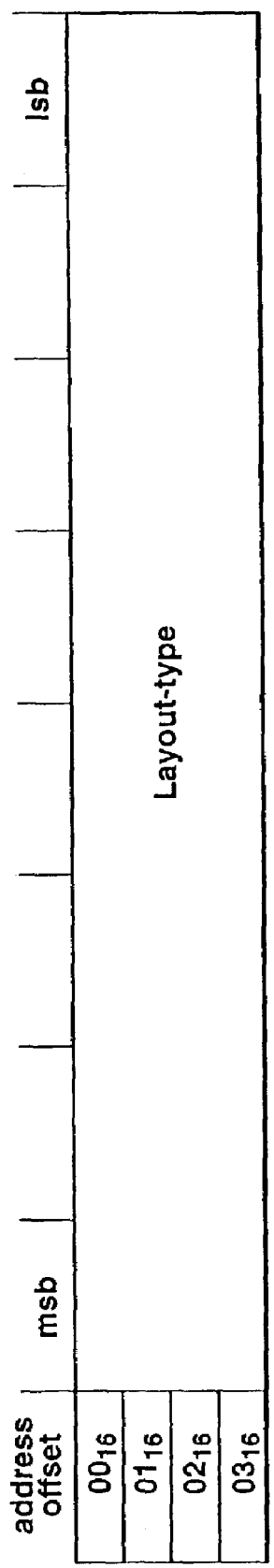
FIG. 31 illustrates the meaning and contents of the layout_type.

In the layout setting information (Layout_type), 4 bytes of the Layout_type are stored, as shown in FIGS. 31 and 32. This layout setting information, represented by a hex number of from 00000000 to 0FFFFFFF, specifies the layout type. The layout setting information, represented by FFFFFFFF, is device_dependent.

As another example of the operation mode command, shown in FIG. 13, the operation mode 1 and the operation mode 2, contained in a sole packet, may be output to the printer device 5, as shown in FIG. 33.

As this operation mode command, there are stored, next to the print_job_ID, the operation_mode_parameters, corresponding to the above-mentioned operation mode 1 parameter, in the operands [17] to [24], while there are stored operation_mode_optional_parameters, corresponding to the operation mode 2 (OPERATION MODE 2) parameter contained in the operation mode 2 parameter, shown in FIG. 13, in the operands [25] to [29].

Moreover, when the data conversion unit 13 is responsive to the actuating input signal from the actuating input unit 21 to specify the text printing image information and the picture printing image information to make printing setting, the data conversion unit 13 generates an image mode command in the command packet of which the image mode shown in FIG. 33 is stored.

In the image mode command, shown in FIG. 33, the information indicating the image mode (IMAGE MODE EX) is represented by "XX" in hexadecimal notation and stored as opcode. Next, the subfunction is stored as the operand [0], the status is stored as the operand [1] and the reserved is stored as the operands [2] to [4]. Then, print_job_ID is stored as the operands [5] to [16], and the pic (picture) indicating a picture to be printed is stored as the operand [17]. The Char_form (character form) as the text printing image information for specifying the fonts etc concerning the text is stored as the operands [18] to [33], whilst the image_mode_ex_parameters, as the image printing information, is stored as the operands [34] to [40].

In the subfunction, status, print_job_ID, the information of the same contents as the OPERATION MODE 2 command, shown in FIG. 13, is stored. In the pic, a picture printed in a job indicated by the print_job_ID stored in the operands [5] to [16] is shown. For each picture, the above-mentioned Char_form and image_mode_ex_parameters are stated.

In the Char_form, the Type specifying the type of the font, Style specifying the text style, Size specifying the font size, color specifying the font color and the Attribute specifying the ornamental fillet, are stored.

In the Type, parameters for specifying the type when printing the text on the side printer device 5 are stored. Specifically, the information corresponding to the Device_dependent, Min-dynasty fonts, gothic fonts, printing style (kaisho style), round gothic fonts, and POP, is stored, beginning from the msb. This Type specifies the printing image pertinent to the fonts by the data conversion unit 13 or the data input unit 31 setting bits for respective setting items.

Figure 36:
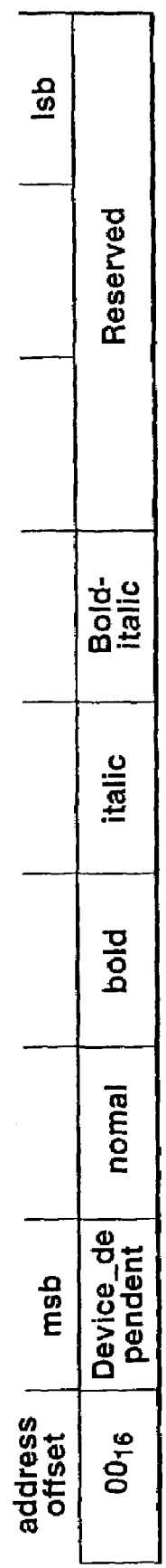
FIG. 36 illustrates respective setting items contained in the Style of the Char_form of the command packet containing the image mode command.

In the Style, parameters for specifying the font style when the text is printed on the side printer device 5 are stored, such that, as shown in FIG. 36, the information corresponding to the Device_dependent, normal, bold, italic and Bold_italic is stored. In this Style, the font style is specified by the bits for the respective setting items being set by the data conversion unit 13 or the data input unit 31.

In the Size, the parameters for specifying the font size when printing the text on the side printer device 5 are stored. For example, one point is set to 1/72 inch and specified between 8 and 36 points.

In the color, parameters for specifying the font color when printing the fonts on the side printer device 5 are stored. 8 bits are allocated to each of R, G and B.

Figure 37:
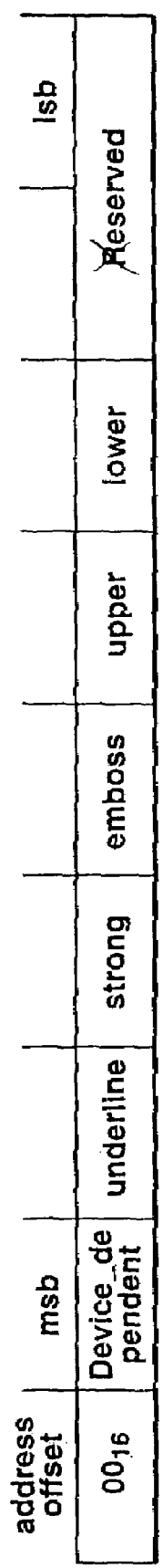
FIG. 37 illustrates respective setting items contained in the Attribute of the Char_form of the command packet containing the image mode command.

In the Attribute, parameters for specifying the ornamental fillets in printing the fonts on the side printer device 5 are stored. Specifically, the information corresponding to Device_dependent, underline, strong, emboss, upper and lower is stored, beginning from the msb side, as shown in FIG. 37. In this Style, bits pertinent to respective setting items are set by the data conversion unit 13 or the data input unit 31 to specify the font style.

In the image_mode_ex_parameters, the information corresponding to Device_dependent, Auto (automatic correction) indicating automatic correction of the printing image on the side printer device 5, Print off (no correction) indicating that no printing image be corrected on the side printer device 5 and Manual (manual correction) indicating printing image correction by the user acting on the side STB 3, is stored, so that one of these pieces of information is specified by a bit being set in association with each item, as shown in FIGS. 38 and 39.

In the above-mentioned image_mode_ex_parameters, the color_space, specifying the color space, Brightness, as a parameter pertinent to luminance, Contrast, as a parameter pertinent to contrast, saturation, as a parameter pertinent to color saturation/color density, sharpness, as a parameter pertinent to sharpness and balance as a parameter pertinent to color balance, are stored next to Reserved. These items, namely the brightness, contrast, saturation, sharpness and balance, are valid when the bits are set in connection with the above-mentioned Manual.

Figure 40:
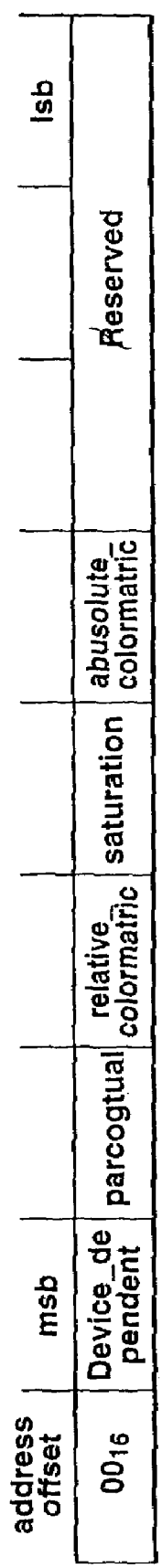
FIG. 40 illustrates the meaning and contents of respective setting items contained in the rendering_intent of the image_mode_ex_parameters of the Char_form of the command packet containing the image mode command.

As for the above-mentioned image_mode_ex_parameters, rendering_intent, shown in FIGS. 40 and 41, are stored next to balance. In this rendering_intent, there are stored pieces of the information corresponding to the device_dependent, perceptual (perceptual image), relative_colorimetric (maintaining relative color gamut), saturation (graphic), absolute_colorimetric (maintaining absolute color gamut) are stored, beginning from the msb. The maintenance of the relative color gamut indicates that, when the color gamut of image data transmitted from the side STB 3 exceeds the printing-enabling color gamut, the printing is made as the color gamut of the entire image is relatively changed, whereas the maintenance of the absolute color gamut indicates that, even if the color gamut of the image data transmitted from the side STB 3 exceeds the color gamut that permits printing on the printer device 5, printing is performed without changing the color gamut of the image data from the STB 3. Meanwhile, the perceptual, relative_colorimetric, saturation (color saturation (graphic)) and absolute_colorimetric indicate the processing contents standardized by ICC.

Referring to FIG. 2, the printer device 5 includes the data input unit 31, for inputting still image data from the printer device 5, a ROM (read-only memory) 32, having stored therein a printing control program, a print engine 33 for printing on a support and a CPU 35 for controlling various component portions.

The data input unit 31 includes an interfacing circuit pursuant to e.g., the IEEE 1394 standard. The interfacing circuit is responsive to a control signal from the CPU 35 to process the still image data contained in the asynchronous packet 100 from the STB 3 in accordance with the IEEE 1394 standard.

Specifically, this data input unit 31 performs the processing for the transaction layer, link layer and the physical layer, under management over a serial bus pursuant to the IEEE 1394 standard. So, the data input unit 31 outputs still image data contained in the asynchronous packet 100 to the CPU 35.

On reception of a command packet, in which the image mode command shown in FIG. 33 is stored, as described above, the data input unit 31 outputs the various text printing image information and the picture printing image information, stored in the Char_form and in the image_Mode_ex_parameters, to the CPU 35. The CPU 35 is responsive thereto to control the print engine 33 to cause the text and the image to be printed in accordance with various settings.

Furthermore, on reception from the data conversion unit 13 of the command packet, having the operation mode 2 parameter stored therein, the data input unit 31 outputs the various pieces of the printing setting information to the CPU 35.

When the data input unit 31 has verified that "get" for acquiring the image mode parameter of the printer device 5 is stored as a subfunction, the data input unit 31 recognizes the setting which the side STB 3 desires to acquire in the text printing image information and in the picture printing image information. The data input unit 31 returns a packet, containing the image mode parameter pertinent to the recognized setting, as a response to the data conversion unit 13.

When the data input unit 31 has verified that the "set" for setting the image mode parameter of the printer device 5 is stored as the subfunction, the data input unit 31 recognizes the setting desired on the side STB 3, among the text printing image information and the picture printing image information. The data input unit 31 outputs to the CPU 35 the information for setting the image parameters concerning the recognized settings.

When the data input unit 31 has verified that the "qualy" for inquiring as to the possible setting range of the image mode parameter is stored as the subfunction, the data input unit 31 checks the bits of the respective setting items, among the text printing image information and the picture printing image information, to recognize the setting inquired by the data conversion unit 13. The data input unit 31 returns a packet, which is an asynchronous packet 100 containing the possible setting parameter values pertinent to the setting inquired by the data conversion unit 13, as a response to the data conversion unit 13.

If a bit is set in the device_dependent in the text printing image information and in the picture printing image information, the data input unit 31 issues an output indicating that effect to the CPU 35.

When the data input unit 31 is mechanically connected over e.g., an optical cable to the STB 3, the data input unit 31 makes connection setting with the data conversion unit 13 of the STB 3 for transmitting/receiving the asynchronous packet 100 to and from the printer device 5.

A print engine 33 comprises a mechanism for holding and driving the printed matter, a printer head and a printer head driving mechanism, and prints a still image or the text on a support under control by the CPU 35.

The CPU 35 generates a control signal for controlling the data input unit 31 and the print engine 33. At this time, the CPU 35 operates in accordance with a printing control program stored in the ROM 32, while controlling the contents using the RAM 34 as a work area.

When fed from the data input unit 31 with the text printing image information, picture printing image information, printing paper sheet type information (media_type), printing paper sheet size information (media_size), printing quality information (Print_quality), printing color information (Mono-color), printing offset position information (offset) or the layout setting information (Layout_type), the CPU 35 controls the print engine 33 depending on a variety of print settings. On acquisition of the text printing image information or the picture printing image information, the CPU 35 executes the processing consistent with the text printing image information or the picture printing image information on the image data to drive the print engine 33.

Figure 42:
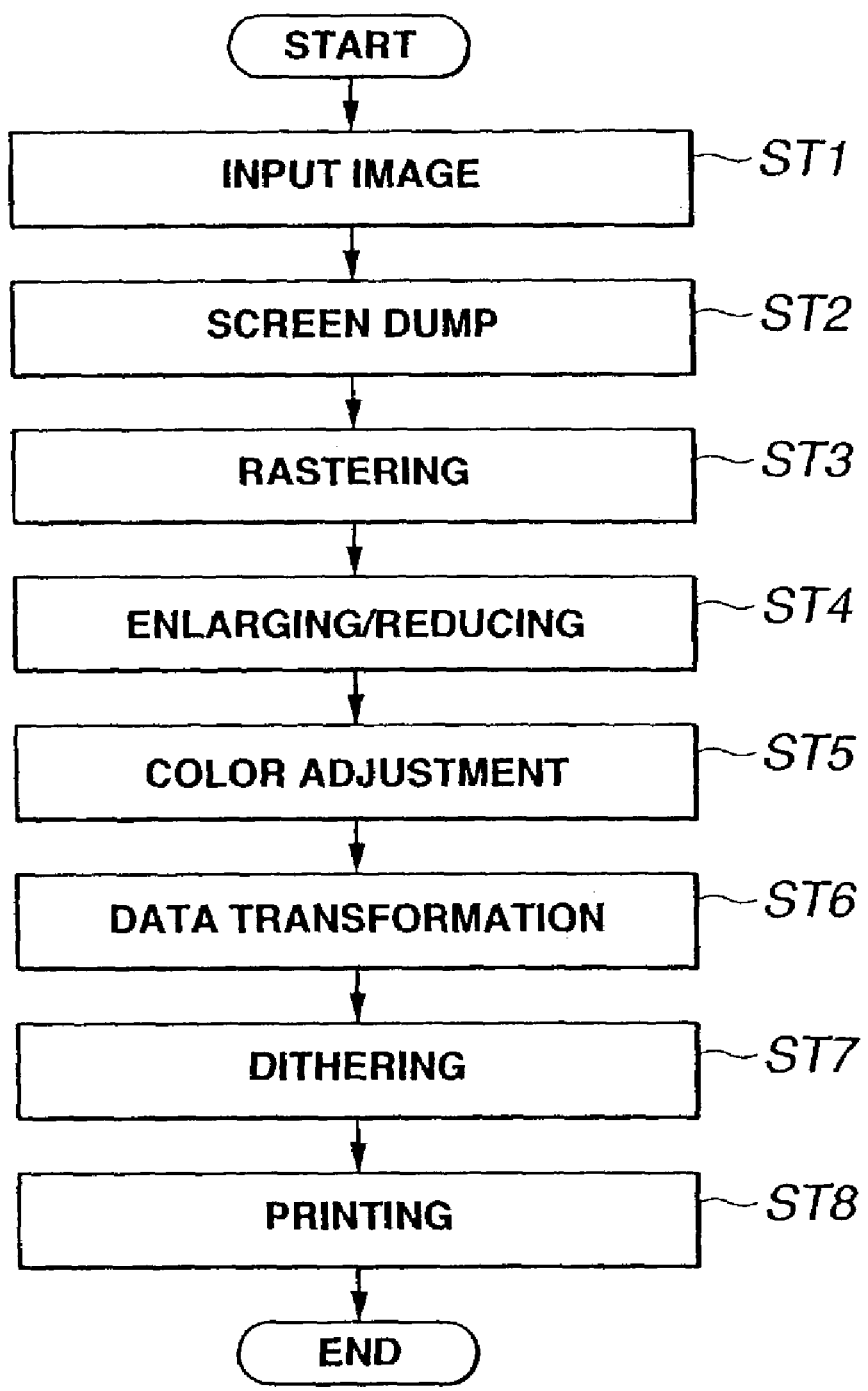
FIG. 42 is a flowchart for illustrating the sequence of operations of the printing processing carried out by the printer device constituting the image printing system according to the present invention.

This CPU 35 performs the processing shown in the flowchart of FIG. 42, in accordance with the printing control program.

Referring to FIG. 42, the data input unit 31 of the printer device 5 at step ST1 first receives a data packet generated in accordance with the IEEE 1394 standard from the data conversion unit 13. The data input unit 31 at this time performs the processing in the transaction layer, link layer and in the physical layer, in accordance with the IEEE 1394 standard, to extract e.g., still image data composed of the luminance information Y and the chrominance information Cr, Cb. If image mode parameters are contained in the command packet, the data input unit 31 outputs the picture printing image information and the text printing image information to the CPU 35. If operation mode parameters are contained in the command packet, the data input unit 31 outputs each printing setting to the CPU 35.

At the next step ST2, the CPU 35 performs screen damping processing of printing the entire matter displayed on the entire screen of the television device 4.

At the next step ST3, the CPU 35 performs rastering processing on the still image data screen-dumped at step ST2. That is, the CPU 35 performs the processing of transforming still image data into dot-form data for transferring the data to the print engine 33.

At the next step ST4, the CPU 35 enlarges/contracts the still image data, processed for rastering at step ST2, in accordance with e.g., the printing size information. That is, the CPU 35 performs the processing of changing the size of the still image for printing within a range specified by the user.

At the next step ST5, the CPU 35 performs color adjustment processing on the still image data, enlarged/reduced in size at the above step ST4, to convert the still image data into printing data made up of the red (Red), green (Green) and blue (Blue), or into monochromatic printing data.

At the next step ST6, the CPU 35 transforms printing data, adjusted for color, and made up of RGB, into cyan, magenta and yellow colors, to determine the proportions of the cyan, magenta and yellow in the respective dots. At the next step ST7, the CPU 35 performs dithering.

At step ST8, the CPU 35 outputs the printing data, obtained on dithering, to the print engine 33, to perform the printing processing of drawing an image on the printed matter. At this time, the CPU 35 sets the printing paper sheet type, printing paper sheet size, printing quality, printing color, printing offset position and layout setting, in accordance with the operation mode parameters stored in a command packet from the data conversion unit 13, to execute the printing processing.

In the above-described image printing system 1, the processing of the CPU 23 in printing the image data received by the STB 3 is explained with reference to FIG. 43.

Figure 43:
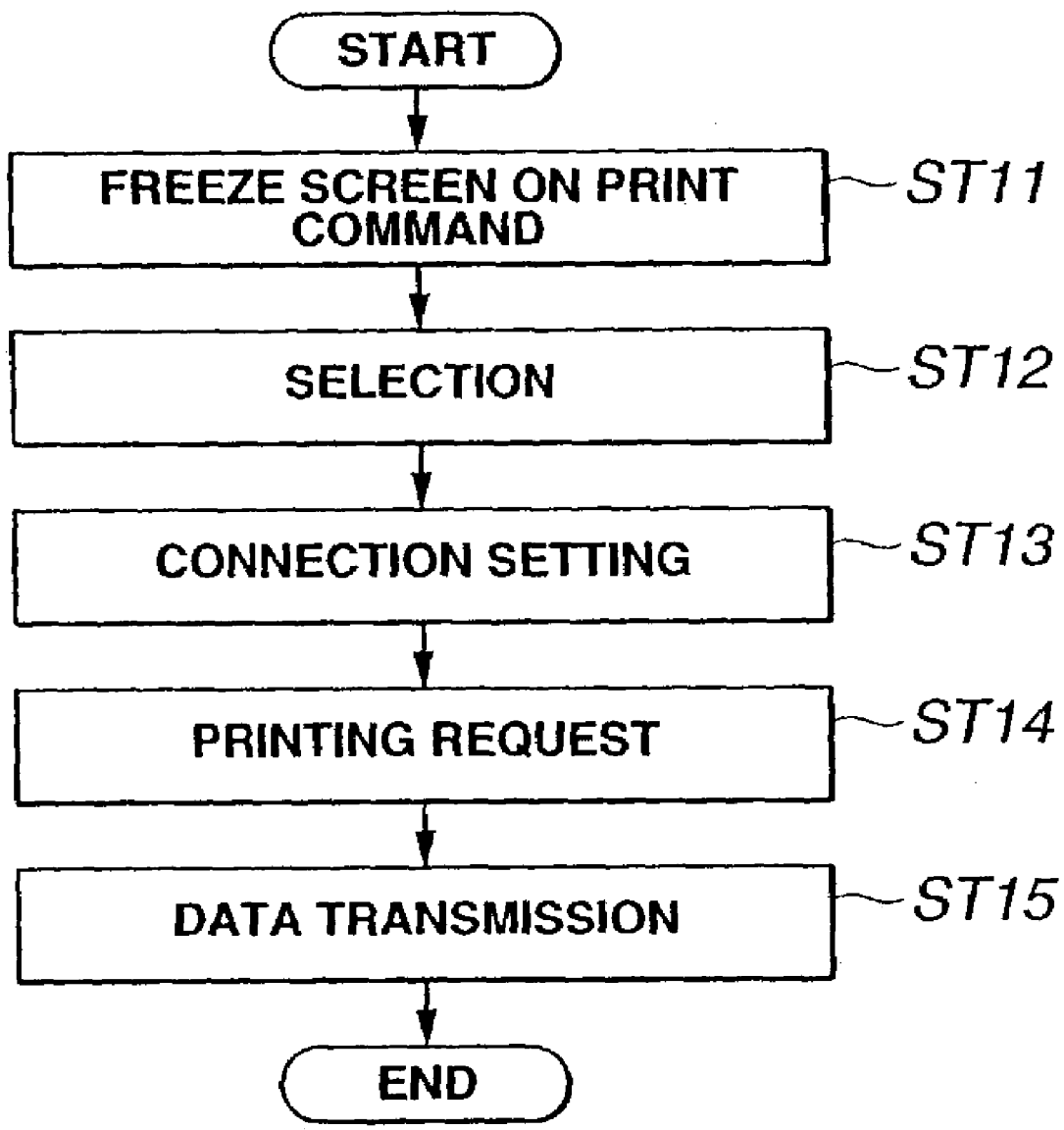
FIG. 43 is a flowchart for illustrating the sequence of operations of CPU of an STB in printing an image displayed on a television device by a printer device.

In the flowchart of FIG. 43, an actuating input signal for freezing the moving picture displayed on the television device 4 is input at step ST11 by the user acting on an actuating button provided on the STB 3. The CPU 23 is responsive thereto to control the display controller 19 to stop the outputting of the moving picture data from the NTSC encoder 18 to the television device 4 to display a still image on the television device 4.

If fed from the actuating input unit 21 with an actuating input signal for selecting frame-based still image data, frozen at step ST11 and displayed on the television device 4, for printing on the printer device 5, the CPU 35 controls, at the above step ST11, the display controller 19, MPEG processor 16 and the demultiplexer 14, to read-in the frame-based still image data stored in the display memory 20 into the image memory 15. This causes the CPU 23 to store the still image data, made up of the luminance information Y and the chrominance information Cr, Cb, in the image memory 15.

At the next step, the CPU 35 controls the printer device 5 to perform connection setting, pursuant to the IEEE 1394 standard, between the STB 3 and the printer device 5. When fed with the control signal for connection setting from the CPU 23, the data conversion unit 13 generates a command packet to perform plug recognition with respect to the data input unit 31. At this time, a command packet having the information indicating the transmission side plug stored therein is transmitted from the data input unit 31 of the printer device 5 to the data conversion unit 13. The data input unit 31 of the printer device 5 sends a command packet, having stored therein the information indicating the reception side plug, which recognizes the information indicating the transmission side plug to effect asynchronous connection. This permits the data conversion unit 13 to recognize the information indicating the reception side plug of the data input unit 31 of the printer device 5. The data input unit 31 recognizes the information representing the transmission side plug of the data conversion unit 13 of the STB 3.

Figure 44:
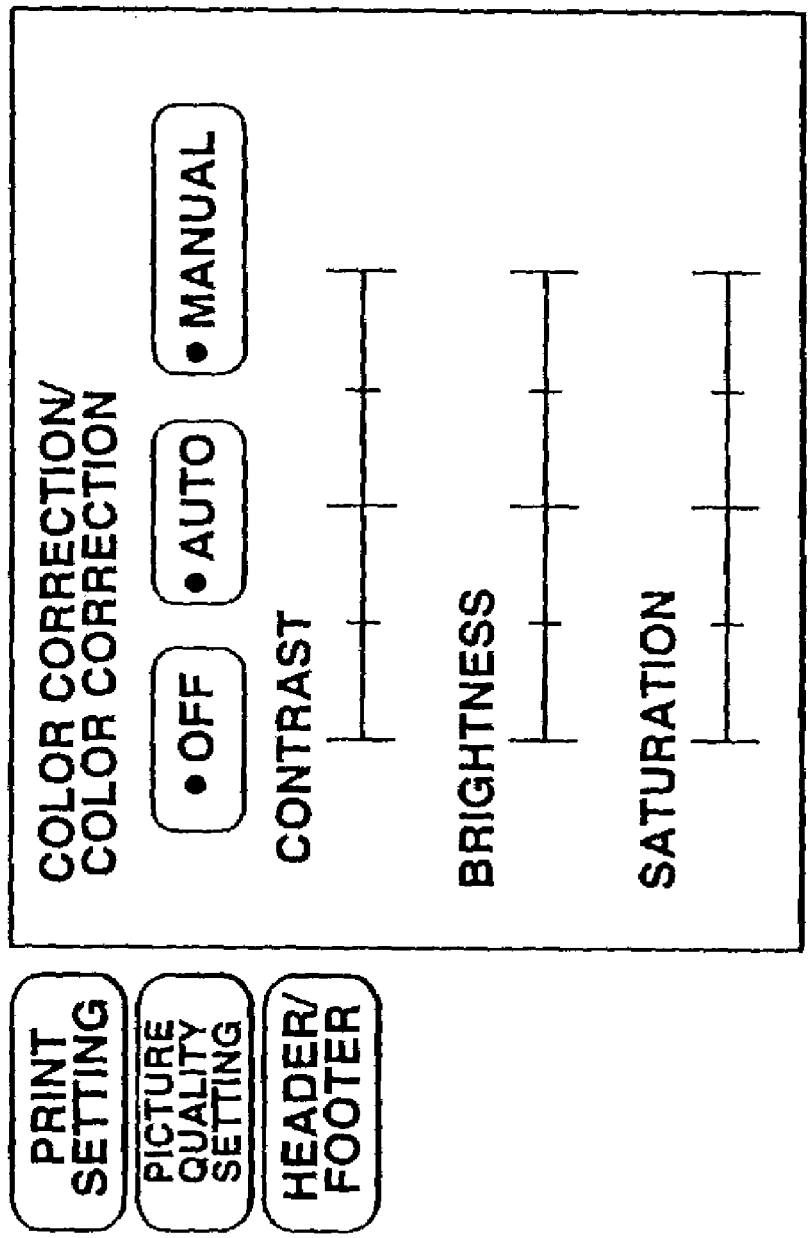
FIG. 44 illustrates setting the setting by a user of the letter printing image information and the image printing image information responsive to a setting screen displayed on the television device.

At the next step ST14, the CPU 23 generates a command packet, designating the printing sheet type, printing sheet size, printing quality, printing color, printing offset position or layout setting in printing a still image by the printer device 5, in accordance with an actuating input signal, to output the produced command packet to the data input unit 31. The CPU also generates a command packet containing a capture command to output the generated command to the data input unit 31 to make a printing request. At this step ST14, it is also possible for the CPU 23 to control the data conversion unit 13 to cause the television device 4 to display parameters pertinent to contrast, brightness and saturation in plural distinct stages, as shown for example in FIG. 44, in manually correcting the image_mode_ex_parameters, in accordance with the operating input command from the actuating input unit 21, and to set the information to be stored in each image_mode_ex_parameter in accordance with the actuating input signal consistent with the respective parameters to generate an image mode command.

At the next step ST15, the CPU 23 controls the data conversion unit 13 and the demultiplexer 14 to output the still image data for printing on the printer device 5 to generate a data packet containing still image data stored in the image memory 15 to transmit the produced data packet to the printer device 5.

The printer device 5 receives plural data packets, containing the information indicating a reception side plug, to receive the totality of the still image data. If the printer device 5 has found that it has received the image mode command, it executes the processing shown in FIG. 32 by the CPU 35 to print the image indicated by the still image data in accordance with e.g., the designated printing size.

An example of transmitting/receiving an asynchronous packet 100 between the STB 3 and the printer device 5 to print the still image data by the printer device 5 is explained with reference to FIG. 45.

Figure 45:
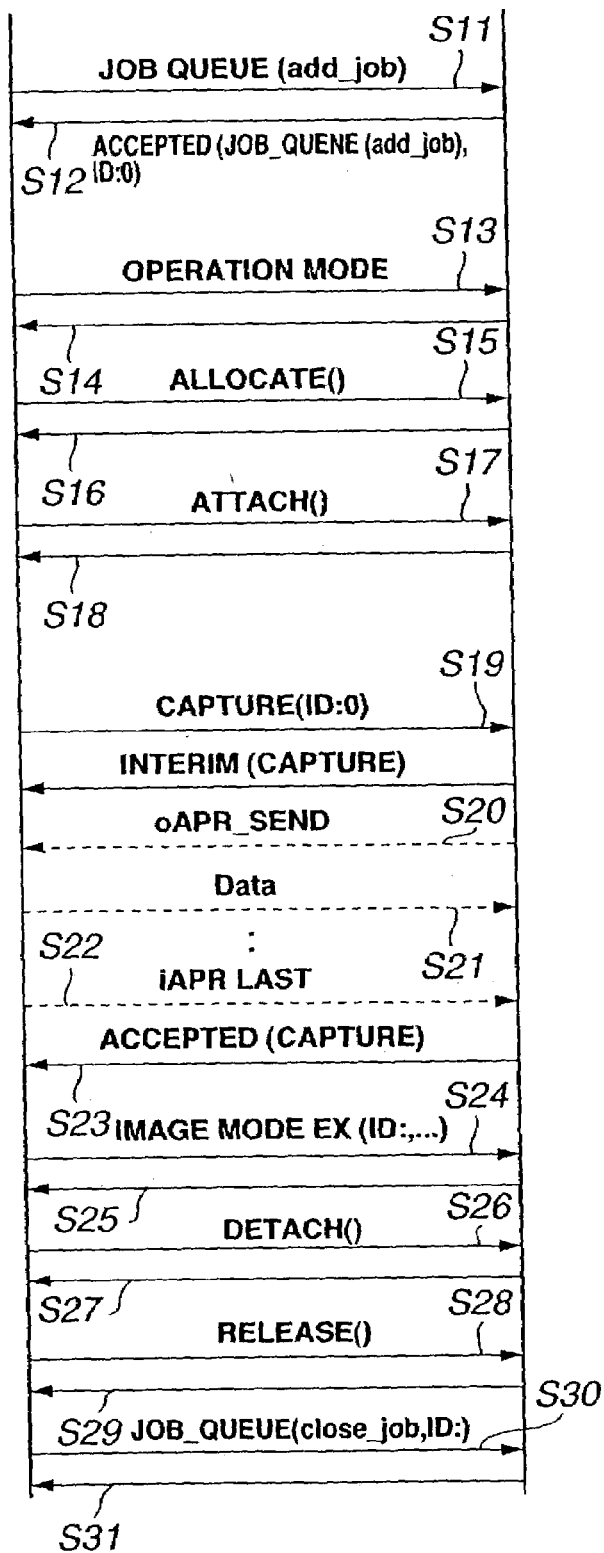
FIG. 45 illustrates the printing processing by the printer device of the still image on transmitting/receiving asynchronous packets between the STB and the printer device.

Referring to FIG. 45, the data conversion unit 13 sends a command packet (JOB_QUEUE) S11 to the printer device 5, prior to stating the printing, to indicate the presence of a job of printing a still image, to acquire a response packet S12 thereto.

The data conversion unit 13 also transmits a command packet S13, specifying the operation mode (OPERATION MODE) indicating the type and size of the printing sheet, printing quality, printing color (monochromatic/color) or the printing positions, and/or the operation mode 2 parameters, containing the printing paper sheet type information, printing sheet size information, printing color information, printing offset position information or the layout setting information, to the printer device 5, to acquire a response packet S14 thereto. At this time, the data conversion unit 13 verifies, based on a response from the printer device 5, whether or not the printer device 5 is able to accept the operation mode parameters.

The data conversion unit 13 sets a plug for transmitting still image data to the data input unit 31. That is, the STB 3 transmits to the data input unit 31 a command packet S15, having stored therein the ALLOCATE command, to the data input unit 31, in order to set the reception side plug, to acquire a corresponding response packet S16.

The data conversion unit 13 also transmits command packet S17, having stored therein an ATTACH command indicating setting a plug for receiving a data packet containing still image data to be printed by the printer device 5 to transmit/receive the data packet to acquire a response packet S18. The printer device 5 is responsive thereto to transmit a response packet (interim) R6a indicating a response that the result cannot be readily returned to the STB 3.

The data conversion unit 13 then transmits a command packet S19 containing a capture command. It is noted that the command packet S19 has contained therein the information indicating the transmission side plug on the side data conversion unit 13 (source_plug). This allows the data input unit 31 to recognize the transmission side plug of the data conversion unit 13.

The data input unit 31 then transmits a packet S20, containing the information for setting the oAPR (output Asynchronous Port Register), to the data conversion unit 13. In the packet S20 is contained the information indicating the reception side lug of the data input unit 31 (dest_plug) of the data input unit 31. At this time, the data input unit 31 transmits the packet S20, containing the information indicating the transmission side plug recognized as a result of reception of the command packet S19. The data conversion unit 13 recognizes the reception side plug of the data input unit 31.

The data conversion unit 13 then transmits to the data input unit 31 a data packet S21 in a data portion 102 of which is stored the image data and/or text data. The data conversion unit 13 splits the still image data and/or text data into pre-set plural data volume portions to transmit plural data packets S21.

The data conversion unit 13 sends to the data input unit 31 a response packet S22 containing the information pertinent to the iAPR (input Asynchronous Port Register) of a flow control register of the transmission side plug.

The data input unit 31 transmits a command packet S23, indicating that a capture command has been accepted, to the data conversion unit 13.

The data conversion unit 13 transmits to the data input unit 31 a command packet S24 containing the image mode command shown in FIG. 33. At this time, the data conversion unit 13 generates a command packet containing variable picture printing image information and the text printing image information, indicated by the actuating input signal, to output the generated command packet to the data input unit 31, to acquire a response packet S25 thereto.

The data conversion unit 13 is responsive thereto to transmit a command packet S26, containing a DETACH command indicating the disconnection from the printer device 5, to acquire a response packet S27 from the data input unit 31.

The data conversion unit 13 transmits a command packet S28, containing a RELEASE command, to the data input unit 31 of the printer device 5, to acquire the response packet S29 from the data input unit 31.

The data conversion unit 13 transmits to the data input unit 31 a command packet indicating the end of a sequence indicating the still image printing job (JOB_QUEUE) S30 to acquire a response packet S31 thereto.

After the end of transmission/reception of the command packet and the response packet, the printer device 5 performs the processing shown in FIG. 42, in accordance with the picture printing image information and the text printing image information, contained in the image command, to effect printing.

With the above-described image printing system 1, it is possible, even if the STB 3 and the printer device 5 are interconnected pursuant to the IEEE 1394 standard, to have the picture printing image information and the text printing image information contained in the asynchronous packet 100 to transmit the resulting asynchronous packet to the printer device 5 to vary the printing image or the text image responsive to the request by the user.

That is, with the present image printing system 1, it is possible for user to generate an actuating input signal requesting the particular printing quality or printing speed to cause the printer device 5 to effect the printing consistent with the actuating input signal.

What is claimed is:

1. A television receiver comprising:
   a reception unit for receiving picture signals;
   a picture processing unit for processing said picture signals to generate picture data;
   a setting unit for setting at least one of a text printing image information indicating the picture processing contents for a text at the time of printing by a printer device and a picture printing image information indicating the picture processing contents for a picture at the time of printing by said printer device;
   a control information generating unit for generating printing control information containing at least one of the text printing image information and the picture printing image information as set by said setting unit; the printing control information including at least a printing quality setting, a media type setting, a media size setting, offset position information and a printing color setting responsive to on actuating input signal; and
   an outputting unit for outputting said picture data generated by said picture processing unit and the printing control information generated by said control information generating unit, in a form in which said picture data and the printing control information are contained in a custom defined command packet consistent wit the IEEE (The Institute of Electrical and Electronics Engineers) 1394 standard.

2. A television receiver comprising:
   reception means for receiving picture signals;
   picture processing means for processing said picture signals to generate picture data;
   setting means for setting at least one of a text printing image information indicating the picture processing contents for a text at the time of printing by a printer device and a picture printing image information indicating the picture processing contents for a picture at the time of printing by said printer device;
   control information generating means for generating printing control information containing at least one of the text printing image information and the picture printing image information as set by said setting means; the printing control information including at least a printing quality setting, a media type setting, a media size setting, offset position information and a printing color setting responsive to an actuating input signal; and
   outputting means for outputting said picture data generated by said picture processing means and the printing control information generated by said control information generating means, in a form in which said picture data and the printing control information are contained in a custom defined command packet consistent with the IEEE (The Institute of Electrical and Electronics Engineers) 1394 standard.

* * * * *